US010686585B2

(12) United States Patent
Nguyen et al.

(10) Patent No.: US 10,686,585 B2
(45) Date of Patent: *Jun. 16, 2020

(54) METHODS AND DEVICES FOR BROADCAST CHANNEL DECODING

(71) Applicant: Intel Corporation, Santa Clara, CA (US)

(72) Inventors: Hoang Nguyen, San Diego, CA (US); Yuanye Wang, San Diego, CA (US); Herbert Dawid, Herzogenrath (DE); Chuxiang Li, Fremont, CA (US); Xiaofei Song, San Diego, CA (US); Gwang-Hyun Gho, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,472

(22) Filed: Aug. 31, 2018

(65) Prior Publication Data

US 2020/0076568 A1 Mar. 5, 2020

(51) Int. Cl.
H04L 7/04 (2006.01)
H04L 1/18 (2006.01)
(Continued)

(52) U.S. Cl.
CPC ............ *H04L 7/042* (2013.01); *H04L 1/1819* (2013.01); *H04L 1/1845* (2013.01); *H04W 56/0005* (2013.01); *H04W 64/006* (2013.01)

(58) Field of Classification Search
CPC ..... H04L 1/0045; H04L 1/0054; H04L 7/033; H04L 27/2602; H04L 1/1887; H04N 21/4382
(Continued)

(56) References Cited

U.S. PATENT DOCUMENTS

2015/0124856 A1  5/2015 Youssef et al.
2016/0128011 A1* 5/2016 Yang ................. H04W 4/70
                                              370/329
(Continued)

FOREIGN PATENT DOCUMENTS

WO    WO 2017/155239 A2    9/2017
WO    WO-2018203616 A1 * 11/2018
WO    WO-2019022575 A1 *  1/2019

OTHER PUBLICATIONS

3rd Generation Partnership Project (3GPP), "NR Physical channels and modulation (Release 15)", Technical Specification Group Radio Access Network, 3GPP TS 38.211 V15.2.0, Jun. 2018, 96 pages, 3GPP Organizational Partners.
(Continued)

*Primary Examiner* — Leila Malek

(57) ABSTRACT

A wireless communication device may include a reference signal detector configured to detect a first synchronization block in a received signal and to determine a position of the synchronization block within a pattern of synchronization blocks, a controller configured to identify, based on the position, one or more additional synchronization blocks including payloads that are related to a payload of the first synchronization block, a combiner configured to combine the payload of the first synchronization block with the payloads of the one or more additional synchronization blocks to obtain a combined payload, and a decoder configured to decode the combined payload to obtain payload data.

18 Claims, 12 Drawing Sheets

(51) Int. Cl.
*H04W 56/00* (2009.01)
*H04W 64/00* (2009.01)

(58) Field of Classification Search
USPC .......................................................... 375/343
See application file for complete search history.

(56) References Cited

U.S. PATENT DOCUMENTS

2019/0021062 A1* 1/2019 Abedini ............... H04J 11/0073
2019/0150110 A1* 5/2019 Ko .......................... H04J 11/00

OTHER PUBLICATIONS

3rd Generation Partnership Project (3GPP), "NR Multiplexing and channel coding (Release 15)", Technical Specification Group Radio Access Network, 3GPP TS 38.212 V15.2.0, Jun. 2018, 98 pages, 3GPP Organizational Partners.

3rd Generation Partnership Project (3GPP), "NR Physical layer procedures for control (Release 15)", Technical Specification Group Radio Access Network, 3GPP TS 38.213 V15.2.0, Jun. 2018, 99 pages, 3GPP Organizational Partners.

3rd Generation Partnership Project (3GPP), "NR Radio Resource Control (RRC) protocol specification (Release 15)", Technical Specification Group Radio Access Network, 3GPP TS 38.331 V15.2.0, Jun. 2018, 304 pages, 3GPP Organizational Partners.

3rd Generation Partnership Project (3GPP), "NR Requirements for support of radio resource management (Release 15)", Technical Specification Group Radio Access Network, 3GPP TS 38.133 V15.2.0, Jun. 2018, 79 pages, 3GPP Organizational Partners.

Astri et al., "Efficient design of SS block", R1-1612289, 3GPP TSG-RAN WG1 #87, Reno, USA, Nov. 5, 2016, seven pages.

Zte et al., "Considerations on SS block design", R1-1611268, 3GPP TSG RAN WG1 Meeting #87, Reno, USA, Nov. 5, 2016, seven pages.

Qualcomm et al., "WF on Sync signal Structure", R1-1613154, 3GPP TSG RAN WG1 Meeting #87, Reno, USA, Nov. 29, 2016, 3 pages.

International Search Report, Application No. PCT/US2019/048679, dated Dec. 12, 2019, three pages.

* cited by examiner

METHODS AND DEVICES FOR BROADCAST CHANNEL DECODING

TECHNICAL FIELD

Various embodiments relate generally to methods and devices for performing broadcast channel decoding.

BACKGROUND

Various radio access technologies may provide for transmission of broadcast channel data across the network. Terminal devices may receive and process this broadcast channel data to determine important information about the network, such as frame timing information and/or system information. In the case of Fifth Generation New Radio (5G NR), cells may broadcast a Physical Broadcast Channel (PBCH) as part of a Synchronization Signal and PBCH (SS/PBCH) block (SSB). These SSBs may include embedded references signals that terminal devices can use to search for and detect the SSBs. After detecting an SSB, a terminal device may identify and decode the PBCH payload to obtain the broadcast channel data contained therein.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
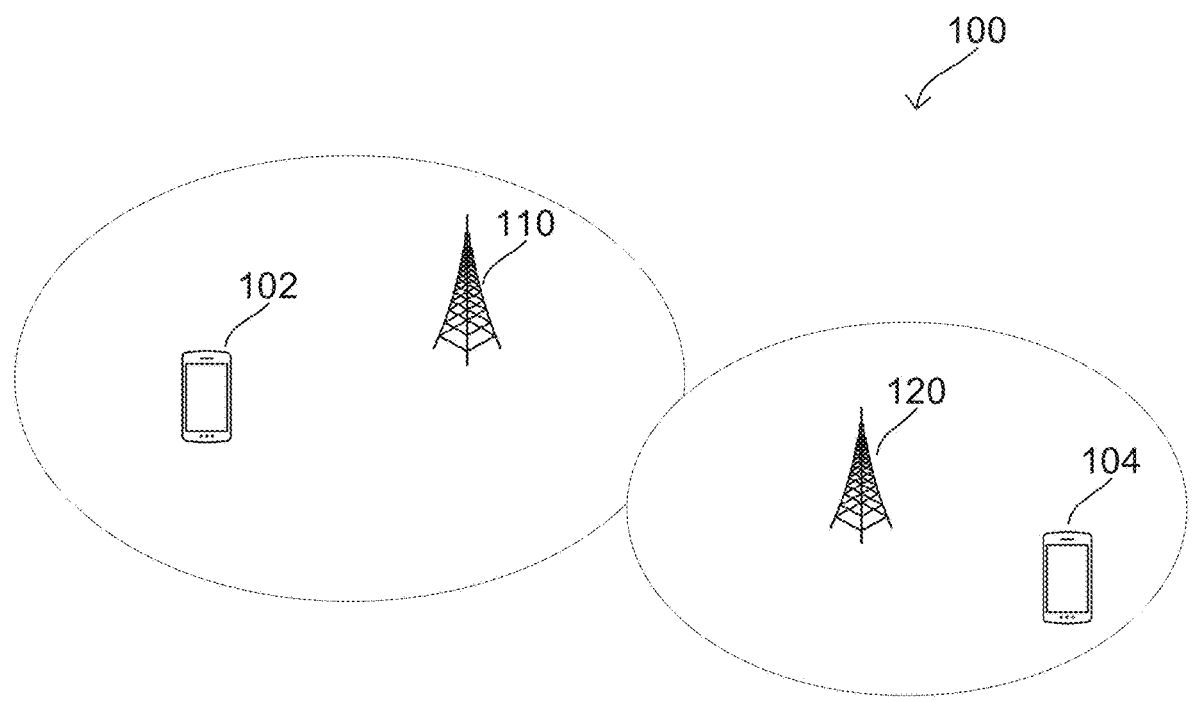
FIG. 1 shows an exemplary configuration of a communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", among others, and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, among others, of data, observations, information, signals, samples, symbols, elements, among others.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Furthermore, registers, shift registers, processor registers, data buffers, among others, are also embraced herein by the term memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
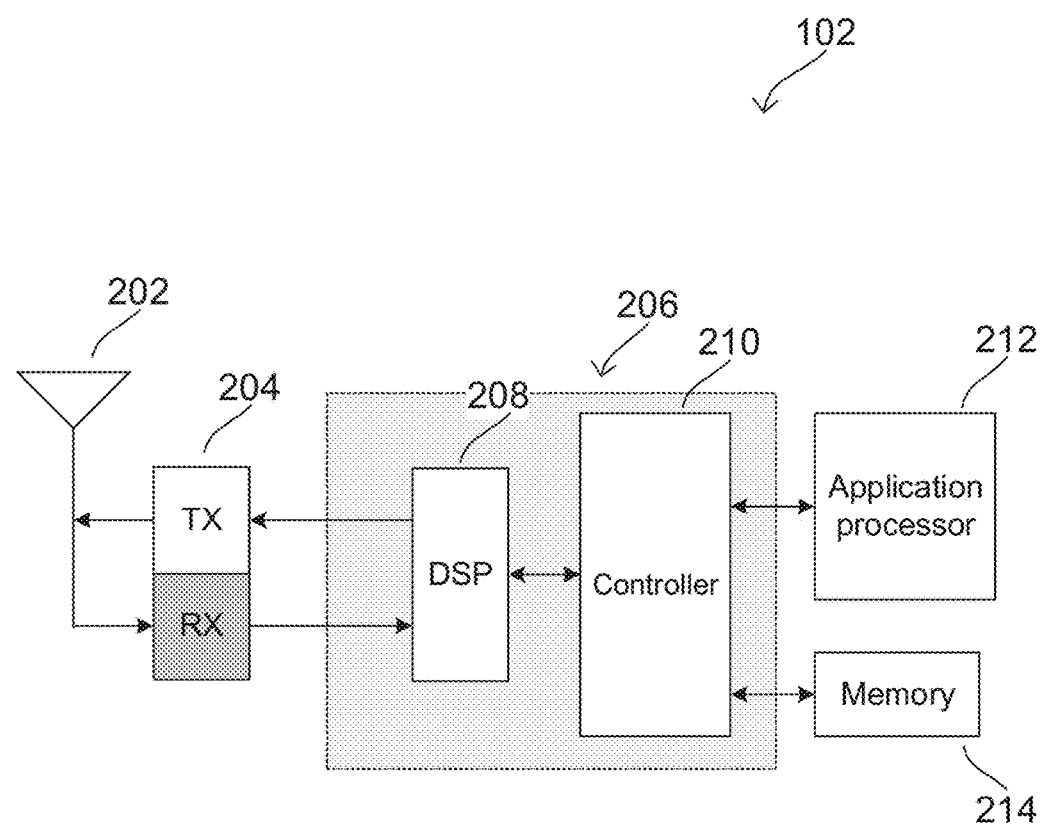
FIG. 2 shows an exemplary configuration of a terminal device according to some aspects.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancellation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

As previously indicated, terminal device 102 may operate according to one or more radio access technologies. In some aspects, terminal device 102 may be configured to operate according to 5G NR, which is a next-generation radio access technology driven by the 3GPP. 5G NR is designed to support multi-beam operation, where the base station (gNodeB for 5G NR) transmits a synchronization block in different spatial directions (i.e., different beams) at different time locations in a half-frame. These synchronization blocks, denoted as Synchronization Signal Blocks (SSBs) in 5G NR terminology, may include both synchronization signals (e.g., Primary Synchronization Signal (PSS) and Secondary Synchronization Signal (SSS)) and the broadcast channel (e.g., Physical Broadcast Channel (PBCH)). When terminal device 102 attempts to detect cells, such as for initial access, cell measurement, or handover, terminal device 102 may attempt to determine the location of an SSB within a half-frame (e.g., 5 ms in 5G NR). Terminal device 102 may utilize the detected SSB to acquire frame timing and may decode the PBCH to acquire the master information block (MIB), which contains key system information that terminal device 102 can use to gain initial access to the detected cell.

Under normal channel conditions, such as those present with shadowing or blockages or at cell edges during handover, the signal-to-interference-plus-noise ratio (SINR) may not be high enough for terminal device 102 to successfully decode the PBCH from a single synchronization block. Accordingly, in some aspects of this disclosure terminal device 102 may receive and combine multiple SSBs from a given cell (e.g., using chase-combining or another combination technique). The terminal device may then attempt to decode the broadcast channel from the combined synchronization block. As the combined synchronization block may have higher SINR than that of a single received synchronization block, this may improve decoding performance and increase the probability of decoding success. This can result in various other benefits, including enabling terminal device 102 to meet certain minimum performance requirements, improving the call drop rate, and/or maximizing power savings.

In the exemplary case of 5G NR, the PBCH payload (e.g., the raw content of the PBCH) may change from one time location to the next within a half-frame. Furthermore, the frame timing of a given cell is not known during initial cell measurement. This can introduce complexity into the synchronization block combining procedure since it may not be effective for terminal device 102 to arbitrarily combine synchronization blocks from different time instants. Accordingly, in various aspects of this disclosure, terminal device 102 may specifically select sets of synchronization blocks that are suitable for combining.

An exemplary arrangement of synchronization blocks for 5G NR will now be described. While 5G NR is used as a basis for this description, these same techniques may be applied in a similar manner to other radio access technologies and/or numerologies, such as where detection and/or broadcast channel decoding is performed using synchronization blocks that appear in a repetitive sequence. With reference to 5G NR, cells may use a transmission schedule designed around 10 ms frames. Each 10 ms frame is further divided two 5 ms half-frames, or alternatively into 10 subframes each having a 1 ms duration. Each 1 ms subframe is then divided into one or more slots, where the number of slots per subframe is variable according to a numerology parameter $\mu$. In particular, 5G NR provides for multiple different possible subcarrier spacings, where each possible subcarrier spacing has a unique slot duration (and thus number of slots per 1 ms subframe). The number of slots per subframe can therefore vary between 1, 2, 4, 8, 16, or 32 slots per subframe. Each slot is further divided into either 12 or 14 symbols (14 for Normal Cyclic Prefix (CP) and 12 for Extended CP), where the duration of each symbol scales according to the slot duration.

The schedule used by cells and terminal devices in 5G NR may therefore be arranged according to a sequence of these frames. When a terminal device such as terminal device 102 attempts to initially detect a cell, terminal device 102 may not know the identity nor the frame timing of the cell. Cells may therefore transmit a pattern of SSBs (generally referred to herein as synchronization blocks) that include a Primary Synchronization Signal (PSS), Secondary Synchronization Signal (SSS), and PBCH. Each SSB may be spread across a set of subcarriers (e.g., a 20 Resource Block (RB) bandwidth) and be spread over a plurality of OFDM symbols (e.g., four OFDM symbols) in time. As previously indicated, a cell may use multi-beam operation to transmit the SSBs, where the cell may transmit different SSBs in a given half-frame using different spatial directions (e.g., using different antenna beams). When terminal device 102 attempts to search for cells, terminal device 102 may search for the PSS and SSS sequences within a received signal (e.g., tuned to a target carrier frequency that terminal device 102 is searching). As cells transmit a sequence of SSBs, terminal device 102 may detect one or more of the SSBs, where terminal device 102 may receive certain SSBs with a higher gain than others depending on which beams used by the base station are most suitable for terminal device 102 (e.g., depending on its position and propagation conditions relative to the base station). By detecting the PSS and SSS (e.g., identifying the specific PSS and SSS sequences transmitted by the base station in the SSB), terminal device 102 may determine the physical cell identity of the base station as well as obtaining initial timing information for the base station.

Depending on the intentions of the terminal device, terminal device 102 may also proceed to decode the PBCH in the SSB, which may include important system information including the Master Information Block (MIB) of the cell. Terminal device 102 may also determine the System Frame Number (SFN) of the cell from the MIB, which may give terminal device 102 the full frame timing information of the cell. Furthermore, decoding the PBCH payload may yield the SSB time index, which identifies the position of the detected SSB within the half-frame (e.g., where the detected SSB is positioned relative to the pattern of SSBs transmitted by the cell in the current half-frame).

As indicated above, in some cases the SINR may not be sufficient for terminal device 102 to reliably decode the PBCH based on a single received SSB. According to various aspects of this disclosure, terminal device 102 may therefore combine PBCH payloads from multiple SSBs received at different times for a given cell and subsequently attempt to decode the combined PBCH payload. As combining techniques may increase SINR of the combined signal, this may improve decoding performance. However, in some cases it may not be suitable to combine arbitrarily selected SSBs from a given cell, as the contents of different SSBs can vary depending on their position in the sequence of SSBs transmitted by the cell. By way of background, a given 5G NR cell may transmit a maximum L of either 4, 8, or 64 SSBs per half-frame, or in other words, may transmit an SSB pattern (having duration of one half-frame) having either 4, 8, or 64 SSBs. The parameter L is governed by the carrier frequency, where carrier frequencies less than or equal to 3 GHz are assigned L=4, carrier frequencies greater than 3 GHz and less than or equal to 6 GHz are assigned L=8, and carrier frequencies greater than 6 GHz are assigned L=64. Each SSB may have an SSB time index that uniquely identifies its position within the SSB pattern; for example, when L=4, the SSB time index for a given SSB may identify the position of the SSB within the size-4 SSB pattern of the half-frame (and likewise for L=8 and L=64). Terminal device 102 may attempt to determine the SSB time index as part of PBCH decoding, as the SSB time index may be useful for time synchronization as well as identifying the corresponding beam used by the cell to transmit the corresponding SSB. Furthermore, as different SSBs may have different contents depending on their frame timing (e.g., which frame they are located in), terminal device 102 may use the SSB time index to identify SSBs that can be combined for PBCH decoding purposes.

In 5G NR, the SSB time index may be at least partially indicated by a Demodulation Reference Symbol (DMRS) index, denoted as $\bar{\imath}_{SSB}$, that identifies a DMRS sequence of the SSB. The cell may include this DMRS as a reference signal within the PBCH, and terminal device 102 may use the DMRS during PBCH decoding. For a given physical cell identity, the DMRS of a given SSB may be one of 8 possible sequences depending on the position of the SSB in the SSB pattern. Terminal device 102 may identify the DMRS index by detecting which of the 8 possible DMRS sequences (having possible values $\bar{\imath}_{SSB}=\{0, 1, \ldots, 7\}$) is present in the SSB. This DMRS index identifies the scrambling sequence used for the PBCH payload (e.g., identifies one of 8 possible scrambling sequences that the base station can use to scramble the PBCH payload) and provides 3 bits of information regarding the SSB time index (that identifies the position of the SSB within the half-frame). Specifically, the DMRS index $\bar{\imath}_{SSB}$ can be expressed as $$\bar{\imath}_{SSB} = i_{SSB} + 4n_{hf} \qquad (1)$$

where $i_{SSB}$ is a parameter indicating part or all of the SSB time index and $n_{hf}$ is the number of the current half-frame within the current frame (e.g., 0 for the first half-frame in the current frame or 1 for the second half-frame in the current frame). The parameter $i_{SSB}$ is referred to herein as the SSB index indicator.

As the DMRS index $\bar{\imath}_{SSB}$ represents 3 bits, it may indicate all or part of the SSB time index depending on L, the maximum number of SSBs per half-frame (i.e., the total number of SSBs in the SSB pattern). For example, when L=4, and there is a maximum of 4 SSBs per half-frame (e.g., the SSB pattern is size-4), the possible values of the SSB time index are {0, 1, 2, 3}. Accordingly, the two least significant bits (LSBs) of the DMRS index $\bar{\imath}_{SSB}$ may represent the SSB index indicator $i_{SSB}$, which is the two LSBs of the SSB time index. In other words, the two LSBs of the detected DMRS index for a given SSB denote the position of the SSB within the current half-frame. As the DMRS index represents 3 bits of information, the remaining bit of the DMRS index $\bar{\iota}_{SSB}$ identify the half-frame $n_{hf}$ in which the SSB occurs. In other words, if the remaining bit of $\bar{\iota}_{SSB}$ equals 0 the SSB occurs in the first half-frame of the current frame, while if the remaining bit of $\bar{\iota}_{SSB}$ equals 1 the SSB occurs in the second half-frame of the current frame. Accordingly, for L=4, the DMRS index fully determines $i_{SSB}$ and $n_{hf}$, and terminal device 102 can therefore determine both the DMRS scrambling sequence as well as the SSB time index (e.g., both the half-frame and the SSB time index that gives the position of the SSB within the SSB pattern).

In the case of L=8, the DMRS index $\bar{\iota}_{SSB}$ may represent the three LSBs of the SSB time index but not indicate which half-frame the SSB occurs in (e.g., may not explicitly indicate the frame timing). In other words, as the DMRS index represents 3 bits, it may represent the position of the SSB within the 8 SSBs of a given half-frame but may not indicate whether the SSB is in the first or second half-frame of a frame. The value of $n_{hf}$ may therefore equal 0, as this information is not represented by the DMRS index, and the DMRS index $\bar{\iota}_{SSB}$ may therefore completely determine the SSB index indicator $i_{SSB}$. Terminal device 102 may be able to identify the half-frame of a given SSB by decoding the half-frame index from the PBCH payload. This information may therefore not be available to terminal device 102 until PBCH decoding is completed.

In the case of L=64, the 64 possible SSB locations may be logically assigned into 8 sequential groups of 8 within the half-frame, with the first 8 SSBs assigned to a first group, the next 8 SSBs assigned to a second group, and so forth. Each group of 8 SSBs is referred to herein as an SSBG8 and may be considered a subset of the SSB pattern. As 6 bits are needed to specify a unique position out of the 64 possible positions in the SSB pattern, the DMRS index $\bar{\iota}_{SSB}$ may therefore only partially represent the SSB time index (the position of the SSB within the half-frame). The DMRS index may therefore identify the position of an SSB within its SSBG8 where the first SSB in the first SSBG8 corresponds to DMRS index $\bar{\iota}_{SSB}=0$, the second SSB in the first SSBG8 corresponds to $\bar{\iota}_{SSB}=1$, and so forth. Similarly, the first SSB in the second SSBG8 will also correspond to DMRS index $\bar{\iota}_{SSB}=0$, the second SSB in the second SSBG8 will also correspond to DMRS index $\bar{\iota}_{SSB}=1$, and so forth. The DMRS index $\bar{\iota}_{SSB}$ may therefore completely determine the SSB index indicator $i_{SSB}$, which gives the three LSBs of the SSB time index. The remaining three bits (e.g., the three MSBs) of the SSB time index (that specify which of the eight SSBG8s an SSB is in) are then provided in the PBCH payload. The half-frame is not represented by the DMRS index, and $n_{hf}$ thus equals 0. Terminal device 102 may therefore be able to determine the three LSBs of the SSB time index by detecting the DMRS index and may be able to determine the remaining three bits as well as the half-frame by decoding the PBCH payload. This SSB time index and frame timing (e.g., which half-frame an SSB is located in) may therefore not be available until PBCH decoding is complete.

Accordingly, for each value of L there may be a maximum number of SSBs per half-frame, and the SSB time index identifies the position of a given SSB within the half-frame and the DMRS index $\bar{\iota}_{SSB}$ provides part or all of the SSB time index (in the form of SSB index indicator $i_{SSB}$). As previously indicated, the SSB time index gives the position of an SSB within the pattern of SSBs in a half-frame (e.g., an SSB time index of 1 specifies that the SSB appears in the second position of the pattern of SSBs). The 3GPP explicitly enumerates the various SSB patterns in 3GPP TS 38.213 (clause 4.1) in terms of the OFDM symbol index that the SSBs are located in a given half-frame, where each possible value of L has a predefined set of SSB patterns. The SSB patterns are specified as follows:

TABLE 1

| SSB Patterns (3GPP TS 38.213) | |
|---|---|
| SCS = 15 kHz (μ = 0) | |
| A1 = [2 8 16 22] | (for RF carrier ≤ 3 GHz) |
| A2 = [2 8 16 22 30 36 44 50] | (for 3 GHz < RF carrier ≤ 6 GHz) |
| SCS = 30 kHz (μ = 1) | |
| B1 = [4 8 16 20] | (for RF carrier ≤ 3 GHz) |
| B2 = [4 8 16 20 32 36 44 48] | (for 3 GHz < RF carrier ≤ 6 GHz) |
| SCS = 60 kHz (μ = 2) | |
| C1 = [2 8 16 22] | (for RF carrier ≤ 3 GHz) |
| C2 = [2 8 16 22 30 36 44 50] | (for 3 GHz < RF carrier ≤ 6 GHz) |
| SCS = 120 kHz (μ = 3), RF carrier > 6 GHz | |
| D = [4 8 16 20 32 36 44 48 60 64 72 76 88 92 100 104 144 148 156 160 172 176 184 188 200 204 212 216 228 232 240 244 284 288 296 300 312 316 324 328 340 344 352 356 368 372 380 384 424 428 436 440 452 456 464 468 480 484 492 496 508 512 520 524] | |
| SCS = 240 kHz (μ = 4), RF carrier > 6 GHz | |
| E = [12 16 20 32 36 40 44 64 68 72 76 88 92 96 100 120 124 128 132 144 148 152 156 176 180 184 188 200 204 208 212 288 292 296 300 312 316 320 324 344 348 352 356 368 372 376 380 400 404 408 412 424 428 432 436 456 460 464 468 480 484 488 492] | |

The SSB patterns are therefore denoted as A1, A2, B1, B2, C1, C2, D, and E, where each numerology (identified by parameter μ) has one or two predefined SSB patterns. For carrier frequencies less than or equal to 3 GHz, the maximum number L of SSBs in a half-frame (5 ms) is 4 (i.e., the SSB pattern size L is 4) and the possible patterns are A1, B1, and C1. Similarly, for carrier frequencies greater than 3 GHz and less than or equal to 6 GHz, the SSP pattern size L is 8 and the possible patterns are A2, B2, and C2. For carrier frequencies above 6 GHz, the SSB pattern size L is 64 and the possible SSB patterns are D and E. Each of the integers in a given pattern indicates the OFDM symbol index (relative to the first OFDM symbol of the half-frame) that contains the first OFDM symbol of a potential SSB. For example, for pattern A1 the first SSB in the SSB pattern can begin at OFDM symbol 2 in the half-frame, the second SSB in the SSB pattern can begin at OFDM symbol 8 in the half-frame, and so forth. In some cases, a cell may transmit SSBs at each SSB time index of a given SSB pattern (e.g., an SSB starting at each OFDM symbol index in the SSB pattern), while in other cases cells may transmit SSBs at less than all of the SSB time indices of a given SSB pattern (e.g., may selectively transmit SSBs at some but not all of the SSB time indices of the SSB pattern). Accordingly, the SSB time indices represent possible time locations of an SSB. As denoted in Table 1, patterns A1 and A2 are respectively the same as patterns C1 and C2 in terms of the OFDM symbol indices; however, they have different time scales due to their differing subcarrier spacing (SCS) values (which yield different symbol durations, as previously described above).

Each SSB index indicator $i_{SSB}$ within a given SSB pattern therefore refers to the OFDM symbol index at that index within the SSB pattern.

The SSB patterns in Table 1 are expressed in terms of their half-frame OFDM symbol indices. The SSB patterns can also be expressed in terms of their half-subframe indices within a half-frame, or in other words, by the index of the half-subframe that the SSB appears in within the half-frame. For example, each subframe (five of which constitute a half-frame) can be divided into a half-subframe of 0.5 ms duration and containing $7 \cdot 2^\mu$ OFDM symbols (as the number of slots in a subframe is variable per the numerology parameter $\mu$). Table 2 below thus expresses the half-subframe index of the SSBs (within a given half-frame) in the various SSB patterns.

TABLE 2

| SSB Pattern | SSB half-subframe indices |
|---|---|
| A1 | [0 1 2 3] |
| A2 | [0 1 2 3 4 5 6 7] |
| B1 | [0 0 1 1] |
| B2 | [0 0 1 1 2 2 3 3] |
| C1 | [0 0 1 1] |
| C2 | [0 0 1 1 2 2 3 3] |
| D | [0 0 0 0 0 0 0 0 1 1 1 1 1 1 1 1 2 2 2 2 3 3 3 3 3 3 3 4 4 4 4 5 5 5 5 5 5 5 5 6 6 6 6 6 6 6 7 7 7 7 8 8 8 8 8 8 8 8 9 9 9 9] |
| E | [0 0 0 0 0 0 0 0 0 0 0 0 0 0 0 0 1 1 1 1 1 1 1 1 1 1 1 1 1 1 2 2 2 2 2 2 2 2 2 2 3 3 3 3 3 3 3 3 3 3 3 3 3 3 3 3 3 3 3 3 4 4 4 4 4 4 4 4] |

This expression of the SSB patterns in terms of half-subframe indices may be useful in identifying SSBs that can be combined prior to PBCH decoding. In particular, the half-subframe indices may help to determine the precise time separation between SSBs when they fall in different half-subframes. Similar to the first symbol of each slot in LTE, the first OFDM symbol of each half-subframe in 5G NR has a longer CP than the other symbols in the half-subframe. The fact that the first OFDM symbol of each half-subframe has a longer CP can therefore be considered when attempting to accurately determine the separation in time between OFDM symbols (e.g., when identifying SSBs for combination).

The preceding description of SSB patterns in 5G NR thus provides the basis which terminal device 102 may use to identify SSBs for combination in PBCH decoding. As previously indicated, SSBs have different contents depending on their time location, and thus not all SSBs can be effectively combined with other SSBs. Terminal device 102 may therefore be configured to utilize the available information in terms of SSB patterns and DMRS indices to identify sets of SSBs for combination. While this description focuses on synchronization block combination and broadcast channel decoding for 5G NR, this is merely for purposes of illustration. Accordingly, these same devices and techniques can be equivalently applied for decoding purposes in other radio access technologies.

Figure 3:
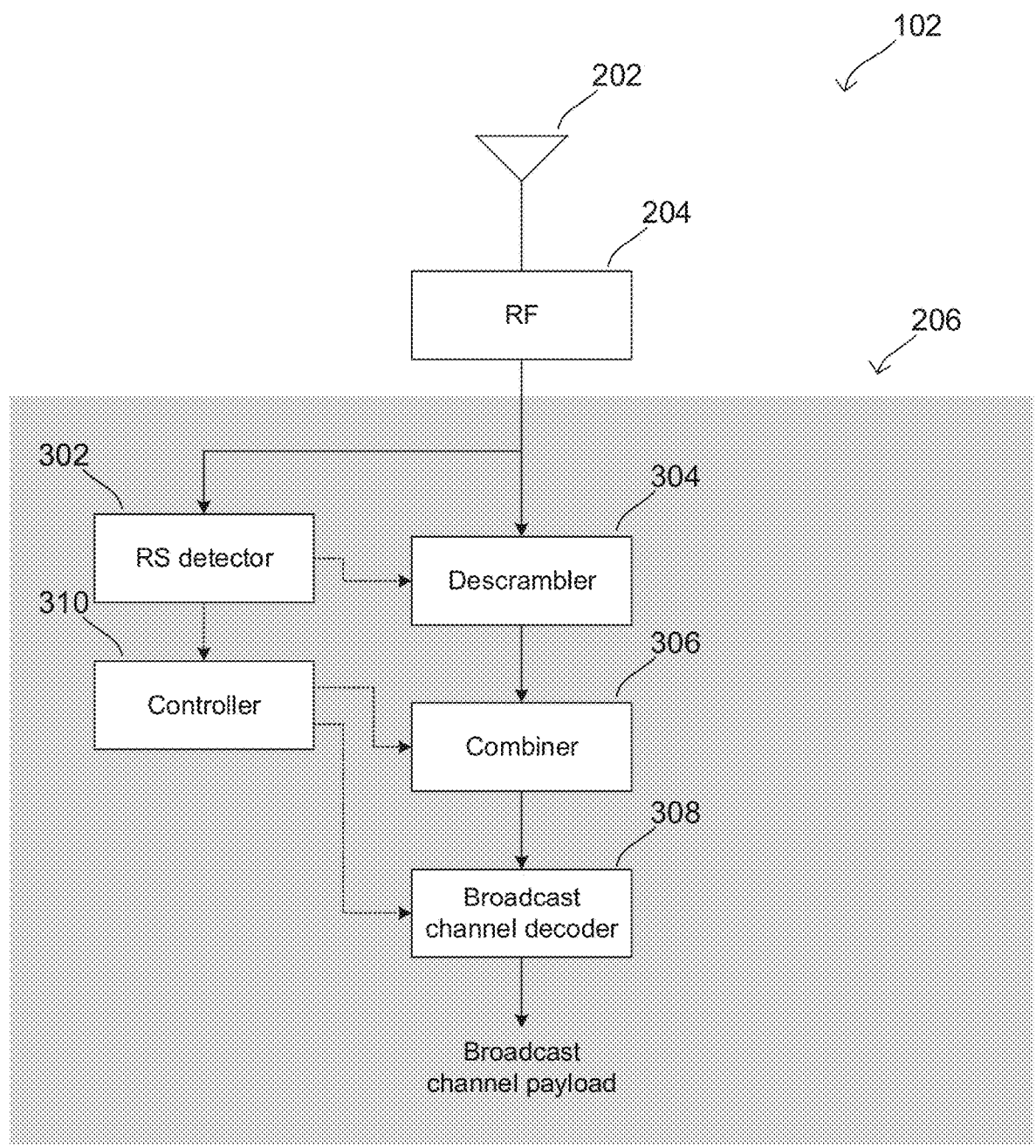
FIG. 3 shows an exemplary internal configuration of a terminal device for performing broadcast channel decoding according to some aspects.

FIG. 3 shows an exemplary internal configuration of terminal device 102 according to some aspects. The depiction illustrated in FIG. 3 is focused primarily on the broadcast channel decoding functionality of terminal device 102, and for explanatory purposes may not expressly depict other components of terminal device 102 that are less directly related to broadcast channel decoding. As shown in FIG. 3, terminal device 102 may include antenna system 202, RF transceiver 204, and baseband modem 206, which may be configured in the manner described above for terminal device 102 in FIG. 2.

FIG. 3 also depicts various internal components of baseband modem 206, including reference signal (RS) detector 302, descrambler 304, combiner 306, broadcast channel decoder 308, and controller 310. As discussed above regarding FIG. 2, baseband modem 206 may include digital signal processor 208 and protocol controller 210. The components of baseband modem 206 shown in FIG. 3 can therefore in some aspects be internal components of digital signal processor 208 (e.g., physical layer components) and/or internal components of protocol controller 210 (e.g., protocol stack components).

In various aspects, RS detector 302, descrambler 304, combiner 306, broadcast channel decoder 308, and controller 310 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. In one exemplary aspect, of this disclosure, controller 310 may be a processor configured to execute firmware that controls various operations of terminal device 102, including broadcast channel reception and decoding. In this exemplary aspect, RS detector 302, descrambler 304, combiner 306, and broadcast channel decoder 308 be hardware components, such as dedicated hardware logic configured to respectively perform reference signal detection, payload combination, and broadcast channel decoding. The hardware and/or algorithmic structure of each of RS detector 302, descrambler 304, combiner 306, broadcast channel decoder 308, and controller 310 is detailed in full in the following descriptions. While RS detector 302, descrambler 304, combiner 306, broadcast channel decoder 308, and controller 310 are shown separately in FIG. 3, this depiction generally serves to highlight the operation of baseband modem 206 on a logical level. In some aspects, RS detector 302, descrambler 304, combiner 306, broadcast channel decoder 308, and controller 310 can therefore each be implemented as separate hardware and/or software components. In other aspects, multiple of RS detector 302, descrambler 304, combiner 306, broadcast channel decoder 308, and controller 310 can be combined into a unified hardware and/or software component (for example, a hardware-defined circuitry arrangement including circuitry to perform multiple functions, or a processor configured to execute program code that defines instructions for multiple functions). In some aspects, RS detector 302, descrambler 304, combiner 306, broadcast channel decoder 308, and controller 310 may each be a separate instruction set that collectively form an overall algorithm that each includes instructions defining their respective functionality in software logic. One or more processors of baseband modem 206 may then realize their respective functionality by executing their corresponding instruction sets.

As detailed in the description of the following aspects, terminal device 102 may utilize RS detector 302, descrambler 304, combiner 306, broadcast channel decoder 308, and controller 310 to perform a variety of operations related to SSBs, including detecting DMRS sequences (including identifying the DMRS index), descrambling PBCH payloads, identifying information about the position of an SSB in an SSB pattern and half-frame, selecting a set of SSBs including PBCH payloads that can be combined, modifying PBCH payloads to render them suitable for combining, combining the set of PBCH payloads to obtain a combined PBCH payload, and decoding the combined PBCH payload.

Figure 4:
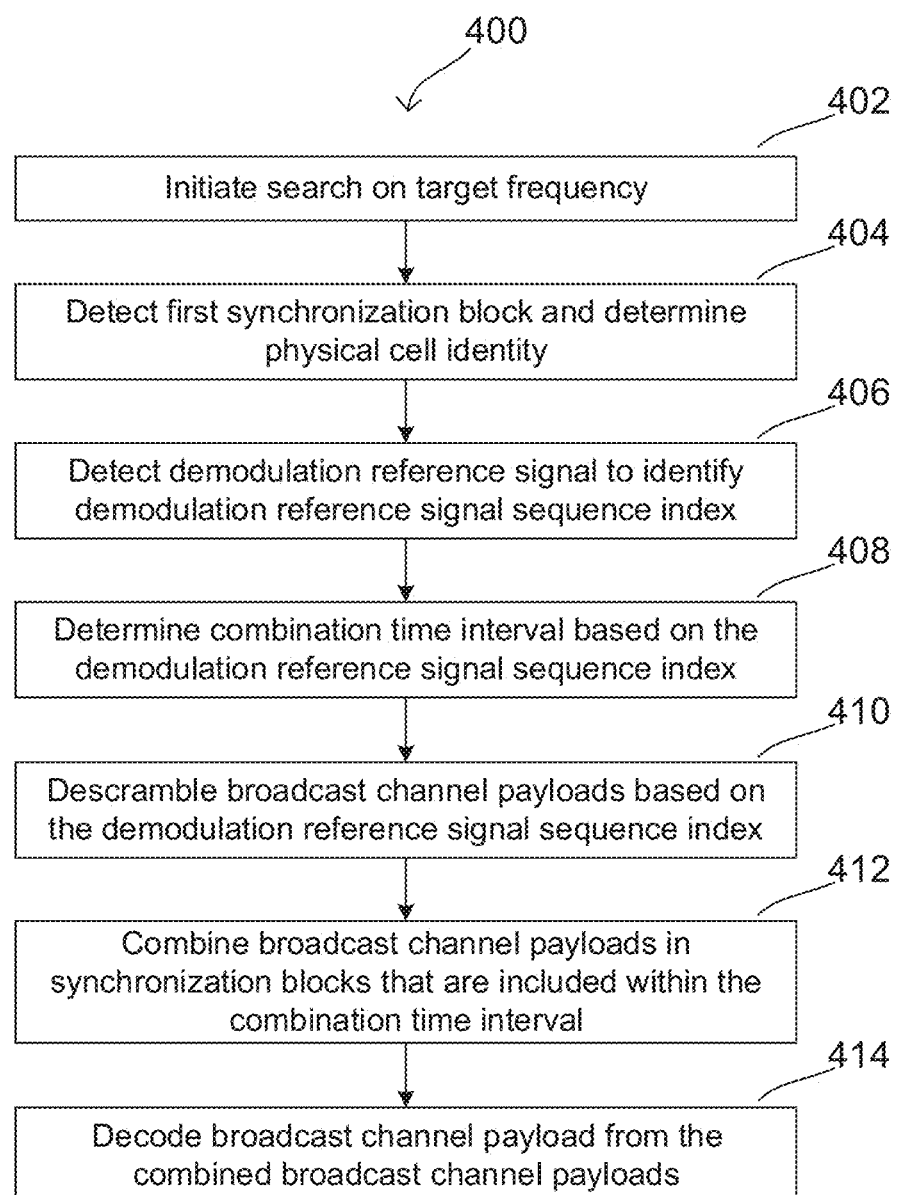
FIG. 4 shows an exemplary procedure for combining broadcast channel payloads across synchronization blocks in a pattern of synchronization blocks according to some aspects.

Terminal device 102 may utilize a particular broadcast channel combination technique depending on the particular scenario. For example, as previously indicated the SSB pattern may vary in different scenarios, and terminal device 102 may utilize a broadcast channel combination technique suitable for the particular scenario. FIG. 4 shows exemplary procedure 400 according to some aspects, which terminal device 102 may be configured to implement for broadcast channel decoding in lower frequency bands. For example, in some aspects terminal device 102 may implement procedure 400 to perform PBCH decoding in 5G NR scenarios where the SSB pattern size L is equal to 4, 8, or 64. In the cases of L=4 and L=8, a given cell may transmit the same PBCH payload (e.g., in the form of a polar codeword) in all SSBs of a given radio frame. Accordingly, only the DMRS sequence and the scrambling sequence segment (applied by the cell prior to transmission) may differ between the SSBs. As the maximum SSB pattern size is L=8, the DMRS index $\bar{\iota}_{SSB}$ (along with the physical cell identity) of a given SSB may completely determine the SSB time index; in other words, the DMRS index $\bar{\iota}_{SSB}$ may give the exact index position of the SSB within the SSB pattern of the half-frame. Accordingly, when terminal device 102 determines the DMRS index for an initial SSB, terminal device 102 may be able to combine the PBCH payload from the initial SSB with the PBCH payloads of each of the remaining SSBs in the SSB pattern of the half-frame (as these SSBs will have identical PBCH payloads due to their occurrence in the same frame). In the case of L=64, the DMRS index $\bar{\iota}_{SSB}$ may only indicate the position of the initial SSB within its SSBG8; however, as each SSB in an SSBG8 is in the same frame, terminal device 102 may be able to combine the PBCH payload from the initial SSB with the PBCH payloads of each of the remaining SSBs in the SSBG8. Procedure 400 thus provides a detailed procedural description for these operations.

As shown in FIG. 4, controller 310 may initiate cell search on a target frequency in stage 402. The target frequency can be any frequency of interest, such as any carrier frequency for a 5G NR system. If the target frequency is less than or equal to 3 GHz, controller 310 may use L=4. If the target frequency is greater than 3 GHz and less than or equal to 6 GHz, controller 310 may use L=8. If the target frequency is greater than 6 GHz, controller 310 may use L=64. In various aspects, controller 310 may initiate the cell search as part of an initial access procedure or to perform neighbor cell measurements.

Once the cell search has initiated, terminal device 102 may receive radio signals via antenna system 202. RF transceiver 204 may tune its reception carrier frequency to the target frequency and downmix and digitize the radio signals to obtain baseband data (e.g., IQ samples). RF transceiver 204 may provide the baseband data to baseband modem 206, which may use the baseband data as the received signal for purposes of further processing.

RS detector 302 may be configured to detect reference signals in the received signal. In various aspects, RS detector 302 may be configured to detect one or more of PSS sequences, SSS sequences, or DMRS sequences in the received signal. In some aspects, RS detector 302 may utilize a correlation-based detection technique, such as where RS detector 302 may utilize a local copy of predefined reference signal sequences to correlate against the received signal to detect the location of a reference signal in the received signal.

In stage 404, RS detector 302 may detect an initial SSB (e.g., a first synchronization block) in the received signal. For example, as an SSB in 5G NR may include a PSS, RS detector 302 may detect the initial SSB by detecting a PSS in the received signal. RS detector 302 may also determine the physical cell identity of the cell that transmitted the initial SSB in stage 404. For example, as the indices of the PSS and SSS sequences in the SSB represent the physical cell identity, RS detector 302 may determine the physical cell identity based on the indices of the PSS and SSS sequences that RS detector 302 detects in the initial SSB.

As previously indicated, the physical cell identity may impact both the DMRS sequence and the scrambling sequence applied to the PBCH payload. Accordingly, after determining the physical cell identity, RS detector 302 may detect the DMRS sequence in the initial SSB in stage 406. For example, as there may be 8 possible DMRS sequences in the initial SSB (governed by the physical cell identity), each with a DMRS index $\bar{\iota}_{SSB}=\{0, 1, \ldots, 7\}$, RS detector 302 may compare the 8 possible DMRS sequences to the DMRS sequence in the initial SSB. RS detector 302 may then identity which of the 8 possible DMRS sequences matches the DMRS sequence in the initial SSB and may take the DMRS index corresponding to the matching DMRS sequence as $\bar{\iota}_{SSB}$. RS detector 302 may therefore obtain the DMRS index in stage 406 and provide the DMRS index to controller 310. RS detector 302 may also provide the DMRS index to descrambler 304.

As previously indicated, part of the broadcast channel decoding technique of procedure 400 may include identifying SSBs that include PBCH payloads that can be combined. Accordingly, controller 310 may in stage 408 determine a combination time interval $T_{CC}$ based on the DMRS index, where the combination time interval represents an interval of time that contains subsequent SSBs that can be combined with the initial SSB. As detailed above, each SSB transmitted by a given cell within the same frame has the same PBCH payload; accordingly, terminal device 102 can combine PBCH payloads from SSBs from the same frame. By extension, terminal device 102 can also combine PBCH payloads from SSBs in the same half-frame and/or within the same SSBG8 (as by definition these SSBs are also in the same frame).

Controller 310 may therefore in stage 408 use the DMRS index $\bar{\iota}_{SSB}$ to determine the combination time interval $T_{CC}$ to include subsequent SSBs that fall within the same half-frame and/or frame. Determining $T_{CC}$ may be referred to as identifying the SSBs that can be combined. In the case of L=8, the DMRS index $\bar{\iota}_{SSB}$ may only have sufficient bits to inform controller 310 the position of the initial SSB within its half-frame (e.g., its position in the SSB pattern), and may not inform controller 310 of whether the initial SSB is in the first half-frame or the second half-frame of the current frame. Accordingly, in this case controller 310 may determine the combination time interval $T_{CC}$ to include the subsequent SSBs (i.e., those occurring after the initial SSB) in the same half-frame as the initial SSB.

Specifically, RS detector 302 may detect the initial SSB at time t (e.g., relative to some reference time, such as the start of the IQ sample stream) and may provide t along with the detected DMRS index $\bar{\iota}_{SSB}$ to controller 310. Controller 310 may then determine the combination time interval $T_{CC}$ where any SSBs detected inside of the time window (t, t+$T_{CC}$] can be combined with the initial SSB. In the instant case of L=8, controller 310 may determine $T_{CC}$ to include all subsequent SSBs in the same half-frame as the initial SSB (e.g., all SSBs occurring after the initial SSB in the same half-frame). In the illustrative case of 5G NR, $T_{CC}$ may be based on the parameters specific to the 5G NR numerology. As defined in 3GPP TS 38.211, K=$T_s/T_c$, where $$T_C = \frac{1}{(\Delta f_{max})} \text{ with } \Delta f_{max} = 480 \cdot 10^3 \text{ Hz}$$

and $N_f$=4096, and $$T_s = \frac{1}{(\Delta f_{ref} \cdot N_{f,ref})}$$

with $\Delta f_{ref}$=15*10$^3$ Hz and $N_{f,ref}$=2048, and $N_u^\mu$=2048κ·2$^{-\mu}$. The vector P can denote the applicable SSB pattern for the initial SSB; for example, if the SSB pattern is A2 in Table 1, P=[2 8 16 22 30 36 44 50] and P(0)=2, P(1)=8, P(3)=16, and so forth; in other words, P(i) for a given SSB index i gives the starting OFDM symbol index in the half-frame for the SSB with SSB index i.

As L=8 in the instant case, the DMRS index $\bar{\iota}_{SSB}$ completely determines the SSB time index for the initial SSB in the form of SSB index indicator $i_{SSB}$. Controller 310 may therefore identify the starting OFDM symbol (e.g., starting symbol) for the initial SSB as $l_{in}$=P($i_{SSB}$), and may identify the starting OFDM symbol for the last SSB in the half-frame as $l_e$=P(L-1) (e.g., the starting OFDM symbol for the last SSB in the SSB pattern). As each of the SSBs between $l_{in}$ and $l_e$ (inclusive) are in the same half-frame, any of these SSBs could be combined. Controller 310 may therefore determine $T_{CC}$ as a duration sufficient to include all of these SSBs. Expressed in terms of time, each regular CP OFDM symbol has a time duration of $(N_u^\mu + 144κ·2^{-\mu})T_c$. As each half-frame has a length of 7·2$^\mu$ OFDM symbols, the number of long-CP OFDM symbols (occurring first in each half-subframe) between the initial SSB and the last SSB as $$\left\lfloor \frac{l_e}{7 \cdot 2^\mu} \right\rfloor - \left\lfloor \frac{l_{in}}{7 \cdot 2^\mu} \right\rfloor$$

The long CP and the regular CP differ by 16κ$T_C$ in duration. After determining $l_{in}$ and $l_e$ as defined above, controller 310 may therefore determine $T_{CC}$ as $$T_{CC} = (l_e - l_1)(N_u^\mu + 144κ \cdot 2^{-\mu})T_c + \left(\left\lfloor \frac{l_e}{7 \cdot 2^\mu} \right\rfloor - \left\lfloor \frac{l_{in}}{7 \cdot 2^\mu} \right\rfloor\right)16κT_C + T_\Delta$$

where $T_\Delta$ is a guard time interval to account for channel delay spreads. In some aspects, $T_\Delta$ can be a predefined number. As any two SSBs are generally less than 4 OFDM symbols apart, $T_\Delta$ may be a fraction of the OFDM symbol duration, such as $$T_\Delta = \frac{1}{2}(N_u^\mu + 144κ \cdot 2^{-\mu})T_c.$$

Accordingly, in the instant case of L=8, controller 310 may determine combination time interval $T_{CC}$ in stage 408 to be a duration that includes the initial SSB up to and including the last SSB in the half-frame. Using the detection time t of the initial SSB as the starting point, the time window containing these SSBs can therefore be expressed as (t, t+$T_{CC}$]. As detailed below following the discussion of the L=4 case, controller 310 may provide this combination time interval $T_{CC}$ to combiner 306 for use in stage 412.

In contrast to the case of L=8, when L=4 the DMRS index $\bar{\iota}_{SSB}$ may have sufficient bits to inform controller 310 of both the position of the initial SSB within its half-frame and whether the initial SSB is in the first half-frame or the second half-frame of the current frame. Accordingly, in this case controller 310 may either: a) if the initial SSB is in the first half-frame of the current frame, determine the combination time interval $T_{CC}$ to include the subsequent SSBs in the first half-frame and the second half-frame, or b) if the initial SSB is in the second half-frame of the current frame, determine the combination time interval $T_{CC}$ to include the subsequent SSBs in the second half-frame. In other words, when the DMRS indicates that the initial SSB is in the first half-frame, combiner 306 may be able to combine the PBCH payloads of all subsequent SSBs in the first and second half-frames (as all SSBs in the same frame may carry the same PBCH payload). However, when the DRMS indicates that the initial SSB is in the second half-frame, combiner 306 may only be able to combine the subsequent SSBs in the second half-frame (as those in the next half-frame fall in a different frame and thus contain different PBCH payloads).

Accordingly, after receiving DMRS index $\bar{\iota}_{SSB}$ from RS detector 302, controller 310 may determine the SSB time index of the initial SSB as the two LSBs of the DMRS index (e.g., the SSB index indicator $i_{SSB}$) and may determine the half-frame of the initial SSB from the remaining bit of the DMRS index in stage 408 (e.g., as the first half-frame if the remaining bit $n_{hf}$=0 or as the second half-frame if the $n_{hf}$=1). If controller 310 determines that the initial SSB is in the second half-frame, controller 310 may determine the combination time interval $T_{CC}$ in the same manner described above for the L=8 case. In other words, as the next half-frame may be part of a different frame, controller 310 may not determine $T_{CC}$ to include SSBs occurring in the next half-frame. Accordingly, controller 310 may determine the SSB positions $l_{in}$ and $l_e$ for the initial SSB and the last SSB in the SSB pattern and subsequently determine $T_{CC}$ based on $l_{in}$ and $l_e$. Controller 310 may then provide $T_{CC}$ to combiner 306 for subsequent use in stage 412.

Continuing with the L=4 case, if controller 310 determines that the initial SSB is in the first half-frame, controller 310 may determine the combination time interval $T_{CC}$ to include both the remaining SSBs in the first half-frame and the SSBs in the second half-frame. In one exemplary aspect, controller 310 may determine T'$_{CC}$ based on $l_{in}$ and $l_e$ in the manner described above for $T_{CC}$ in the L=8 case, and may then add 5 ms (e.g., the length of a half-frame) to T'$_{CC}$ to obtain $T_{CC}$. This combination time interval $T_{CC}$ may therefore include both the subsequent SSBs in the same half-frame as the initial SSB (included in T'$_{CC}$) and the SSBs in the next half-frame (included in the 5 ms half-frame length). Controller 310 may then provide this $T_{CC}$ to combiner 306 for use in stage 412. In some aspects, controller 310 may optionally also use the DMRS index $\bar{\iota}_{SSB}$ to perform a consistency check. As the MSB of $\bar{\iota}_{SSB}$ for SSBs in subsequent half-frames cannot be the same, controller 310 may check whether the detected MSBs of $\bar{\iota}_{SSB}$ for SSBs in consecutive half-frames. Controller 310 may therefore be able to determine whether the DMRS detection is reliable or not.

In some alternative aspects, controller 310 may determine $T_{CC}$ to include only SSBs in the current half-frame as the initial SSB and may therefore determine a $T_{CC}$ for combining PBCH payloads in SSBs only in this current half-frame. For example, controller 310 may determine a $T_{CC}$ that does not include SSBs in the next half-frame, regardless of whether the initial SSB is in the first and second half-frame.

In stage 410, descrambler 304 may descramble the PBCH payloads from one or more SSBs. For example, RS detector 302 may specify the time location of one or more SSBs to descrambler 304, which may then be configured to descramble the SSBs based on a scrambling code. As previously described, the DMRS index $\bar{\iota}_{SSB}$ and the physical cell identity of the transmitting cell may determine the scrambling code. Accordingly, descrambler 304 may use the DMRS index $\bar{\iota}_{SSB}$ and the physical cell identity (provided by RS detector 302) to determine the scrambling code for a given SSB. Descrambler 304 may then descramble the PBCH payload of the SSB, which may include reverting the scrambling code to obtain the unscrambled PBCH payload.

In various aspects, descrambler 304 may at least descramble PBCH payload of the initial SSB, and may optionally descramble the PBCH payloads of one or more further SSBs. In some aspects, descrambler 304 may be configured to descramble the PBCH payload of each SSB in the received signal (provided by RF transceiver 204, which may also be preprocessed by other baseband and/or RF components before reading descrambler 304). In other aspects, descrambler 304 may be configured to only descramble the PBCH payloads of certain SSBs. For example, in some aspects controller 310 may provide combination time interval $T_{CC}$ to descrambler 304, and descrambler 304 may exclusively descramble the PBCH payloads of SSBs that are included within $T_{CC}$. In some scenarios, the cell may only transmit SSBs at some of the possible positions within the SSB pattern. Descrambler 304 may thus in some aspects attempt to descramble PBCH payloads of SSBs at these possible positions, but may not descramble PBCH payloads of SSBs at each possible position as the cell may not have transmitted SSBs at these positions. In some aspects, descrambler 304 may perform the descrambling where the received signal is buffered (e.g., at a symbol buffer of baseband modem 206 that buffers the baseband data provided by RF transceiver 204). In other aspects, descrambling 304 may perform the descrambling in a realtime and/or continuous manner, such as on a constant stream of the received signal (which may or may not have a delay).

After descrambling the PBCH payloads, descrambler 304 may provide the PBCH payloads (in descrambled form) to combiner 306. Combiner 306 may then in stage 412 combine the PBCH payloads from SSBs that are included within the combination time interval $T_{CC}$ (provided by controller 310) to obtain a combined PBCH payload. This can apply in both L=4 and L=8 cases. Accordingly, combiner 306 may combine the PBCH payload of at least the initial SSB and the PBCH payloads of one or more subsequent SSBs. In some aspects, combiner 306 may perform the combination by combining the bits at each position of a given PBCH payload with the bits at the same respective positions of a PBCH payload from another SSB. In some aspects, combiner 306 may perform the combination in a sequential manner, such as by combining the PBCH payload of a first SSB with the PBCH payload of a second SSB to obtain a first combined PBCH payload, combining the PBCH payload of a third SSB with the intermediate combined PBCH to obtain a second combined PBCH payload, and so forth until combiner 306 has sequentially combined the PBCH payloads from all of the PBCH payloads included within the combination time interval. In some aspects, combiner 306 may combine the PBCH payloads using a soft combination technique, such as chase-combining or any other soft combination technique that combines soft values (e.g., Log Likelihood Ratios (LLRs)).

In some aspects, combiner 306 may identify the SSBs that are included within the combination time interval $T_{CC}$ and then combine the PBCH payloads from these SSBs in stage 412. In other aspects, descrambler 304 may be configured to identify the SSBs that are included within the combination time interval $T_{CC}$, and may only provide the PBCH payloads from these SSBs to combiner 306. Combiner 306 may then combine these PBCH payloads and may therefore not need to identify the SSBs included within $T_{CC}$. In either case, descrambler 304 or combiner 306 may be configured to identify the SSBs that are included within $T_{CC}$ based on a detection time $t_{SSB}$ that indicates the time (e.g., the time in the stream of baseband samples that form received signal) at which RS detector 302 detected the SSB. As previously indicated, RS detector 302 may detect the initial SSB at time t. Using the time window (t, t+$T_{CC}$] given by t and $T_{CC}$, descrambler 304 or combiner 306 may compare the detection times $t_{SSB}$ of one or more SSBs occurring after the first SSB to determine whether, for each of the SSBs, its $t_{SSB}$ falls between t and t+$T_{CC}$, i.e., falls within the combination time interval $T_{CC}$. If $t_{SSB}$ falls within the combination time interval $T_{CC}$, descrambler 304 or combiner 306 may identify that the PBCH payload from the SSB should be combined.

In some cases, the first SSB may be the last SSB in the half-frame and/or frame. In these cases, controller 310 may either instruct combiner 306 to pass the first SSB through without combining or alternatively may wait until RS detector 302 detects the next SSB, which may be the first SSB in a half-frame or frame. Controller 310 may then determine the combination time interval $T_{CC}$ to include this first SSB and the subsequent SSBs in the same half-frame and/or frame (e.g., depending on whether L=4 or 8). This may enable terminal device 102 to combine a larger number of PBCH payloads, which can improve decoder performance.

At completion of stage 412, combiner 306 may have combined the PBCH payloads from the SSBs that are included within the combination time interval and may have obtained a combined PBCH payload. Combiner 306 may then provide the combined PBCH payload to broadcast channel decoder 308, which may then decode the combined PBCH payload to obtain the original PBCH payload in stage 414. In the illustrative case of 5G NR, the PBCH may be channel coded with polar coding. Accordingly, broadcast channel decoder 308 may decode the polar-coded combined PBCH payload to recover the original PBCH payload. As the combined PBCH payload is the combination of PBCH payloads from multiple SSBs, the SINR of the combined PBCH payload may be higher than the PBCH payload from a single SSB. Broadcast channel decoder 308 may therefore be able to achieve improved decoder performance compared to decoding the PBCH payload from a single SSB.

In some aspects, broadcast channel decoder 308 may be configured to perform an error check to determine whether the PBCH decode was successful or not. In some cases, this can include performing a cyclic redundancy check (CRC) or any other type of error check to determine whether a check value of the decoded PBCH payload matches the correct check value. If broadcast channel decoder 308 determines the PBCH decode was successful, broadcast channel decoder 308 may provide the PBCH payload to another downstream component, such as protocol controller 210, which may then process the PBCH payload. For example, protocol controller 310 may process the PBCH payload to identify the frame number, determine the half-frame, determine the MIB or other system information, and/or determine the remaining bits of the SSB time index. If broadcast channel decoder 308 determines that the PBCH decode was not successful (e.g., the error check fails), broadcast channel decoder 308 may inform controller 310 of the failure. In some aspects, controller 310 may then re-start the PBCH combination and decoding procedure, such as by instructing RS detector 302, descrambler 304, combiner 306, and broadcast channel decoder 308 to identify a new initial SSB for combination and decoding. This can include, for example, repeating stages 404-414 with a new initial SSB. In some aspects, detector 302 may utilize the detection time t of the initial SSB along with its DMRS index $\bar{i}_{SSB}$ to find a new initial SSB that occurs first in its SSB pattern, e.g., has a DMRS index $\bar{i}_{SSB}$ of 1. As this new initial SSB occurs first in its SSB pattern, combiner 306 may be able to combine more SSBs and the resulting combined PBCH payload may have increased SINR.

The preceding description of procedure 400 covered cases where a) L=4 and terminal device 102 combines PBCH payloads from SSBs in the same half-frame and/or in the same frame, and b) where L=8 and terminal device 102 combines PBCH payloads from SSBs in the same half-frame. Terminal device 102 may additionally or alternatively be configured to combine PBCH payloads from SSBs in the same SSB pattern when L=64 (e.g., for carrier frequencies above 6 GHz). To re-summarize, when L=64 in 5G NR, the 3-bit DMRS index $\bar{i}_{SSB}$ may only indicate the position of a given SSB within an SSBG8 (a group of 8 SSBs, where a half-frame includes eight SSBG8s). For example, with reference back to Table 1, the consecutive groups of non-bolded and bolded elements in SSB patterns D and E each make up an SSBG8. The first SSBG8 of pattern D, for example, therefore includes SSB positions (in terms of starting OFDM symbol within a half-frame) of [4 8 16 20 32 36 44 48], while the second SSBG8 of pattern D includes SSB positions [60 64 72 76 88 92 100 104]. As the DMRS index $\bar{i}_{SSB}$ includes only 3 bits, the DMRS index $\bar{i}_{SSB}$ of a given SSB indicates the position index of the SSB within its SSBG8 but does not indicate which SSBG8 (e.g., which of the 8 SSBG8s in a given half-frame) or the half-frame (e.g., whether the SSB is in the first or second half-frame). This information identifying the SSBG8 and the half-frame is represented by bits in the PBCH payload. While terminal device 102 may not have this information available prior to PBCH decoding, terminal device 102 may still be able to combine SSBs from within the same SSBG8. In particular, these SSBs will have the same system frame number in the PBCH payload as they are in the same frame, and will also have the same 3 MSBs of the SSB time index as well as the same half-frame index. Consequently, these SSBs occurring in the same SSBG8 will have the same PBCH payload and can therefore be combined.

Similar to the cases detailed above for L=4 and L=8 in procedure 400, controller 310 may therefore determine a combination time interval $T_{CC}$ that includes SSBs for combination. However, instead of determining $T_{CC}$ to include the remaining SSBs in a given half-frame or frame, controller 310 may determine $T_{CC}$ to include the remaining SSBs that fall within the same SSBG8 as an initial SSB. In this case, terminal device 102 may perform stages 402-406 in the same manner as described above. As L=64, the DMRS index $\bar{i}_{SSB}$ detected by RS detector 302 in stage 406 will indicate the position of the initial SSB in its SSBG8. Controller 310 may then determine $T_{CC}$ to include the remaining SSBs in this SSBG8. Similar to the above cases, controller 310 may base this determination on the presence of any OFDM symbols with longer CPs. With reference to the half-subframe indices shown in Table 2 above, each SSG8 in SSB pattern D is either contained entirely within a single half-subframe (e.g., the first SSG8 being [0 0 0 0 0 0 0 0] and thus entirely within the first half-subframe of the half-frame) or is split between exactly two half-frames (e.g., the fourth SSG8 being [3 3 3 3 4 4 4 4] and thus divided by the half-subframe boundary between half-subframes 3 and 4). Each SSG8 therefore contains either zero or one OFDM symbols with longer CPs, which are positioned as the first OFDM symbol in each half-subframe. The additional time $16\kappa T_c$ representing the difference between the longer CP and the regular CP thus may not significantly impact the time separation between the initial SSB and the last SSB in the SSBG8, and this small difference can be accounted for by the guard time $T_A$.

With reference to SSB pattern E, as shown in Table 2 each SSBG8 is entirely contained within a single half-subframe. Accordingly, no SSBG8 in SSB pattern E contains an OFDM symbol with a longer CP, and there is no additional time difference to be accounted for when determining the combination time interval $T_{CC}$ for these SSBG8s.

Continuing with the description of determining $T_{CC}$ for combining PBCH payloads in the same SSBG8, the subpatterns $d_0, d_1, \ldots, d_7$ and $e_0, e_1, \ldots, e_7$ can be respectively defined as $d_i=[D(8i) \; D(8i+1) \ldots D(8i+7)]$ and $e_i=[E(8i) \; E(8i+1) \ldots E(8i+7)]$, where $i=0, 1, \ldots, 7$ and $D(n)$ and $E(n)$ refer to the n-th index within SSB patterns D and E. The full list of subpatterns is shown below in Table 3. These subpatterns are therefore the position indices of the SSB pattern for a single SSBG8; for example, subpattern $d_0$ gives the position indices of the SSBs within the first SSBG8 in SSB pattern D. Looking at the subpatterns, it can be seen that $d_0$ can be obtained by subtracting a scalar constant from any other subpattern $d_j$. For example, $d_0(7)-d_0(i)=d_j(7)-d_j(i)$ for any $i=0, 1, \ldots, 7$ and $j=0, 1, \ldots, 7$. This relationship also holds for $e_0$; for example, $e_0(7)-e_0(i)=e_j(7)-e_j(i)$ for any $i=0, 1, \ldots, 7$ and $j=0, 1, \ldots, 7$. Because of this relationship, the time difference between an SSB and the last SSB in that SSBG8 is not dependent on the SSBG8 (when ignoring the extra CP time $16\kappa T_c$ for a single possible OFDM symbol with a longer CP in SSB pattern D). In other words, the difference in OFDM symbols between SSBs at the same two positions within a single subpattern will be the same, regardless of the subpattern and SSBG8. Accordingly, the time difference between SSBs can be determined using the subpattern for first SSBG8, namely $d_0$ or $e_0$.

TABLE 3

| Subpatterns from SSB pattern D for SCS = 120 kHz ($\mu$ = 3) |
|---|
| d0 = [4 8 16 20 32 36 44 48] |
| d1 = [60 64 72 76 88 92 100 104] |
| d2 = [144 148 156 160 172 176 184 188] |
| d3 = [200 204 212 216 228 232 240 244] |
| d4 = [284 288 296 300 312 316 324 328] |
| d5 = [340 344 352 356 368 372 380 384] |
| d6 = [424 428 436 440 452 456 464 468] |
| d7 = [480 484 492 496 508 512 520 524] |
| Subpatterns from SSB pattern E for SCS = 240 kHz ($\mu$ = 4) |

TABLE 3-continued e0 = [8 12 16 20 32 36 40 44]
e1 = [64 68 72 76 88 92 96 100]
e2 = [120 124 128 132 144 148 152 156]
e3 = [176 180 184 188 200 204 208 212]
e4 = [288 292 296 300 312 316 320 324]
e5 = [344 348 352 356 368 372 376 380]
e6 = [400 404 408 412 424 428 432 436]
e7 = [456 460 464 468 480 484 488 492]

Controller 310 may therefore utilize subpatterns $d_0$ and $e_0$ to determine the OFDM symbols at which various SSBs occur relative to each other in an SSBG8, and may then utilize these OFDM symbols to determine the combination time interval $T_{CC}$. For example, with reference to FIG. 4, RS detector 302 may detect an initial SSB with DMRS index $\bar{\iota}_{SSB}$ and detection time t (e.g., a time within the received signal, relative to a reference time) in stages 404 and 406. Controller 310 may in stage 408 then utilize an SSB pattern P equal to either $d_0$ (if $\mu=3$) or $e_0$ (if $\mu=4$), and may determine the starting OFDM symbol of the initial SSB as $l_{in} = P(\bar{\iota}_{SSB})$. Similarly, controller 310 may determine the starting OFDM symbol of the last SSB in the SSBG8 as $l_e = P(7)$ (e.g., the OFDM symbol at the last position index of the subpattern). Controller 310 may then determine the combination time interval $T_{CC}$ as $T_{CC} = (l_e - l_{in})(N_u^\mu + 144\kappa \cdot 2^{-\mu})T_c + T_A$, where guard interval $T_A$ is given as explained above (with an extra CP time of $16\kappa T_c$ for SSB pattern D).

This combination time interval $T_{CC}$ may therefore include the initial SSB (starting at OFDM symbol $l_{in}$ in the subpattern) and run through the last SSB (starting at OFDM symbol $l_e$ in the subpattern) in the SSBG8. Combiner 304 may then combine the PBCH payloads from the SSBs occurring within the combination time interval $T_{CC}$ (relative to the detection time t of the initial SSB), which are all in the same SSBG8. As previously detailed, in various aspects descrambler 304 or combiner 306 may be configured to identify the SSBs that are included within the combination time interval $T_{CC}$.

Terminal device 102 may therefore also be able to utilize procedure 400 to combine PBCH payloads from SSBs within the same SSBG8 in the case of L=64. Similarly to the L=4 and L=8 cases, use of the resulting combined PBCH payloads in decoding may improve decoder performance.

In various aspects, terminal device 102 may also perform PBCH payload combining between different half-frames and/or between different SSBG8s. This procedure may include additional processing to identify which SSBs are in the same frame. As previously indicated, in L=8 and L=64 cases the explicit frame timing information (e.g., which half-frame an SSB is in) and/or the SSBG8 information (e.g., which SSBG8 an SSB is in) may only be available after PBCH decoding. However, as further described below, terminal device 102 may be able to determine which SSBs are in the same frame without the explicit frame timing information, which may enable terminal device 102 to combine PBCH payloads from SSBs in different frames. As terminal device 102 may as a result be able to combine more SSBs, this can result in additional SINR increases along with improved decoder performance.

Figure 5:
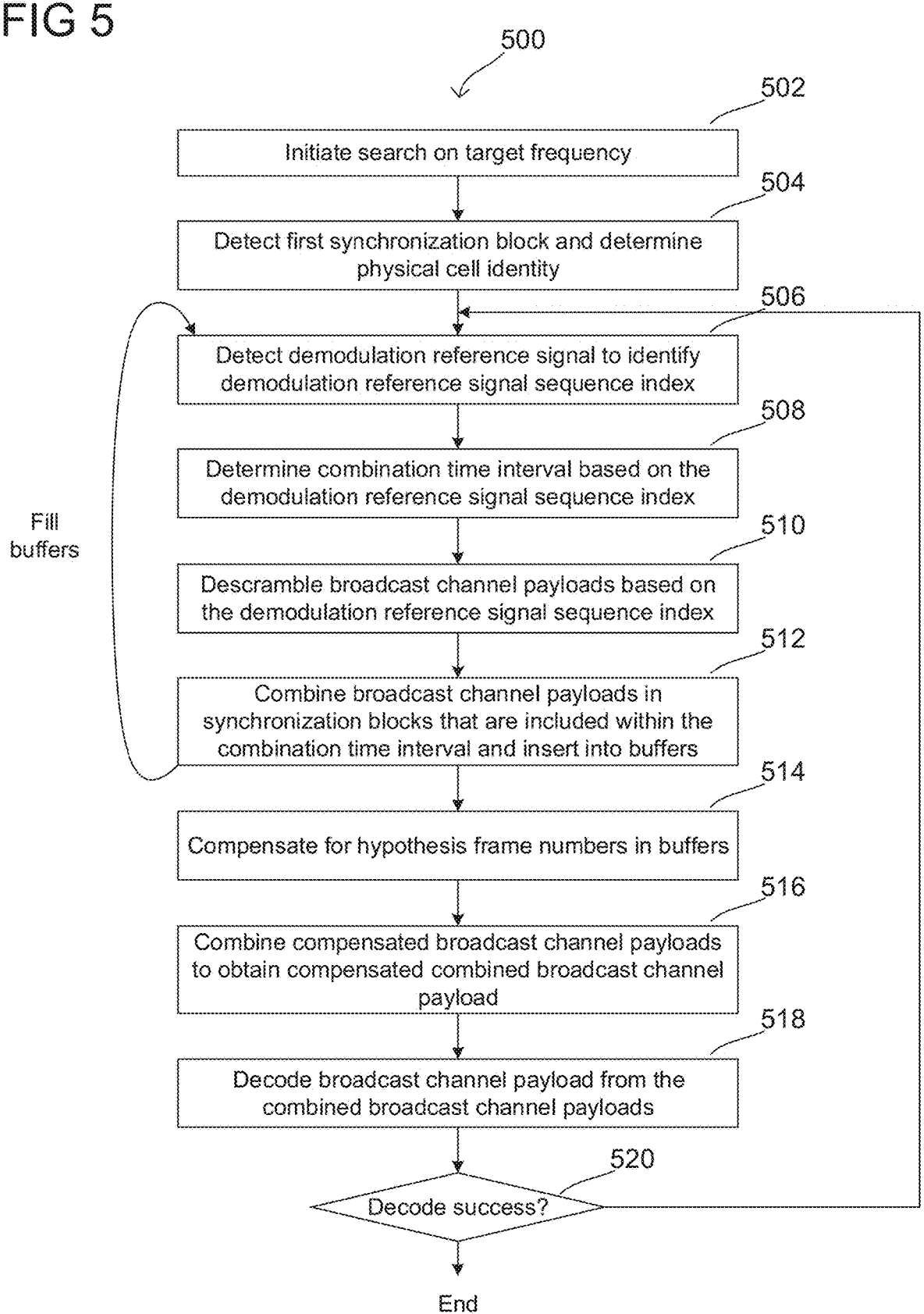
FIG. 5 shows an exemplary procedure for combining broadcast channel payloads across synchronization blocks in different patterns of synchronization blocks according to some aspects.

FIG. 5 shows exemplary procedure 500, which describes a method of combining PBCH payloads between different half-frames according to some aspects. The cases of both L=8 and L=64 will be described, starting first with L=8. In this case, the combined PBCH payload may be from SSBs in the same half-frame (e.g., the same SSB pattern of size-8). As previously indicated, terminal device 102 may not be able to obtain the explicit frame timing information (that identifies the first or second half-frame) until the PBCH payload is decoded. It may therefore be uncertain whether the combined PBCH payload is from SSBs in the first half-frame or the second half-frame of a given frame. Terminal device 102 may therefore utilize buffers to hold combined PBCH payloads from multiple half-frames, and may attempt to alter the buffered PBCH payloads to compensate for differences in the system frame number. Terminal device 102 may then be able to combine the altered PBCH payloads and subsequently decode this combined PBCH payload.

In particular, as shown in FIG. 5 terminal device 102 may perform stages 502-512 in the same manner described above for stages 402-412. Accordingly, for each of a plurality of half-frames, RS detector 302, descrambler 304, combiner 306, broadcast channel decoder 308, and controller 310 may detect SSBs in the received signal, determine a combination time interval, and combine PBCH payloads from SSBs occurring within the combination time interval to obtain a combined PBCH payload for a given half-frame. Combiner 306 may then place the combined PBCH payload into a buffer to complete stage 512. As denoted in FIG. 5, RS detector 302, descrambler 304, combiner 306, and controller 310 may repeat stages 506-512 to fill one or more buffers, which combiner 306 may utilize in later stages to compensate for differences in system frame numbers. Combiner 306 may therefore fill these buffers with combined PBCH payloads from different half-frames.

Figure 6:
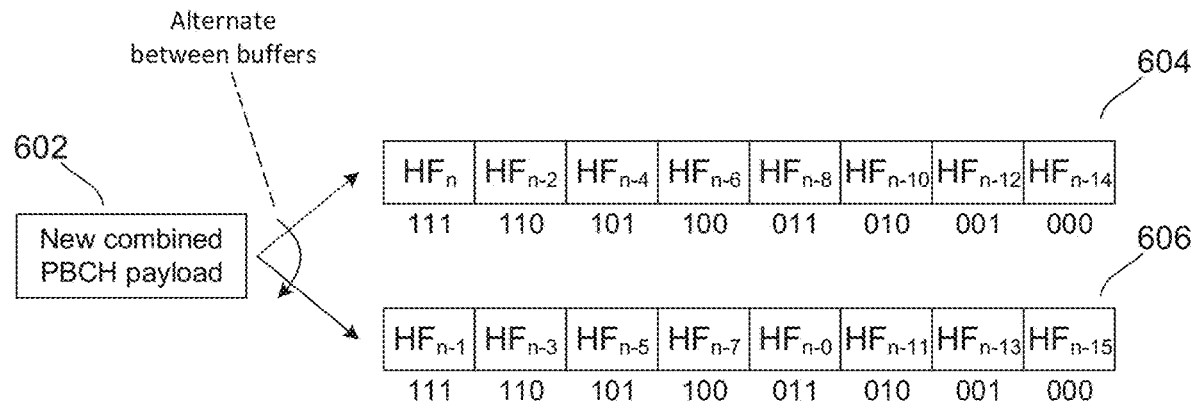
FIG. 6 shows an exemplary buffer configuration for compensating and combining broadcast channel payloads using two buffers according to some aspects.
Figure 7:
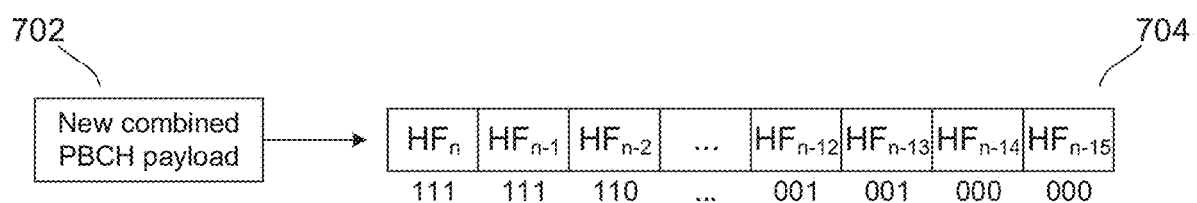
FIG. 7 shows an exemplary buffer configuration for compensating and combining broadcast channel payloads using one buffer according to some aspects.

FIGS. 6 and 7 show two exemplary buffering configurations according to some aspects, where both may illustratively depict buffering for an exemplary L=8 case. Combiner 306 may utilize either buffering configuration in various aspects. In the example of FIG. 6, combiner 306 may obtain a new combined PBCH payload (denoted as 602) from a first half-frame in stage 512, which may be the combined PBCH payloads of the initial SSB and one or more subsequent SSBs included within the combination time interval. Combiner 306 may insert this combined PBCH payload into buffer 604. After repeating stages 506-512 for the next half-frame (e.g., using the first SSB of the next half-frame as the initial SSB and using a combination time interval that includes all SSBs within the next half-frame), combiner 306 may insert the resulting combined PBCH payload into buffer 606. After again repeating stages 506-512 for another next half-frame, combiner 306 may insert the resulting combined PBCH payload into buffer 604. Combiner 306 may therefore fill buffers 604 and 606 in an alternating manner, such as by switching back and forth between inserting the PBCH payload from the most recent half-frame into buffer 604 and inserting the PBCH payload from the most recent half-frame into buffer 606. Combiner 306 may eventually fill both buffers 604 and 606 (e.g., after 16 half-frames). Once full, buffer 604 may contain the PBCH payloads from every-other half-frame starting from the most recent half-frame, $HF_n$, through the $15^{th}$ most recent half-frame, $HF_{n-14}$. Similarly, buffer 606 may contain the PBCH payloads from every-other half-frame starting from the second-most recent half-frame, $HF_{n-1}$, through the $16^{th}$ most recent half-frame, $HF_{n-15}$. In some aspects, buffers 604 and 606 may be first-in/first-out buffers, and may shift all combined PBCH payloads towards the end of the buffer when combiner 306 inserts a new combined PBCH payload. If they are full, buffers 604 and 606 may push out the combined PBCH payload at the last buffer position when combiner 306 inserts a new combined PBCH payload.

As buffers 604 and 606 respectively contain PBCH payloads from alternating half-frames, each consecutive PBCH payload in each buffer will be from sequential frames. In other words, as the PBCH payloads in each buffer are separated from each other by two half-frames in time, the neighboring PBCH payloads in each buffer will be from neighboring frames in time. For example, if the PBCH payload from $HF_n$ (in buffer 604) is from a given first frame, the PBCH payload from $HF_{n-2}$ will be from a second frame immediately prior to the first frame, the PBCH payload from $HF_{n-4}$ will be from a third frame immediately prior to the second frame, and so forth. Similarly, if the PBCH payload from $HF_{n-1}$ (in buffer 606) is from a given fourth frame, the PBCH payload from $HF_{n-3}$ will be from a fifth frame immediately prior to the fourth frame, and the PBCH payload from $HF_{n-5}$ will be from a sixth frame immediately prior to the fifth frame.

Once buffers 604 and 606 are full, combiner 306 may proceed to stage 514, where combiner 306 may alter the combined PBCH payloads in buffers 604 and 606 to compensate for hypothesis system frame numbers. For example, the PBCH payloads in buffers 604 and 606 may contain the same information as each other except that they contain different system frame numbers (e.g., as one of the fields of the PBCH). Accordingly, using buffer 604 as an example, the combined PBCH payload from $HF_n$ may have a system frame number that is one greater (e.g., one integer greater) than $HF_{n-2}$, the combined PBCH payload from $HF_{n-2}$ may have a system frame number that is one greater than that of $HF_{n-4}$, and so forth. In other words, sequential PBCH payloads in each of buffers 604 and 606, moving from most recent to oldest half-frames, may have system frame numbers that decrement by one between each buffer position moving from newest to oldest.

Given this pattern in decrementing system frame numbers, combiner 306 may be configured to alter the combined PBCH payloads to compensate for the differing system frame number fields. Once combiner 306 has compensated for the differing system frame number fields across the combined PBCH payloads, combiner 306 may be able to combine the compensated PBCH payloads (as the compensated PBCH payloads may be the same and thus may be combinable) and subsequently decode the resulting combined compensated PBCH payload. In some aspects, such as shown in FIGS. 6 and 7, combiner 306 may compensate for the differing system frame numbers using hypothesis system frame numbers assigned to the buffer positions. For example, combiner 306 may assign a hypothesis system frame number to each buffer position in buffers 604 and 606. In the example of FIG. 6, the hypothesis system frame numbers may be the three LSBs of the system frame number. The first buffer position (e.g., (n) in buffer 604 and (n−1) in buffer 606) may therefore have a hypothesis system frame number of "111," the second buffer position may have a hypothesis system frame number of "110," the third buffer position may have a hypothesis system frame number of "101," and so forth. In other words, the first buffer position may hypothesize that the combined PBCH payload at the first buffer position has "111" as its three LSBs. As further detailed below, these hypothesis frame numbers are guesses, and combiner 306 may have to shift the PBCH payloads in the buffer positions until the PBCH payloads have actual system frame numbers that match the hypothesis system frame numbers at their respective buffer positions. While the example of FIG. 6 uses a buffer size of 8 and hypothesis system frame numbers of size 3 (e.g., the 3 LSBs), this can be generalized to any buffer size and hypothesis system frame number size, such as any buffer size M and hypothesis system frame number size of $\log_2 M$. Larger values of M may allow for combining of higher numbers of PBCH payloads but may also result in a longer average duration of time before a successful decode (e.g., as the buffers may take longer to fill).

Using these hypothesis system frame numbers, combiner 306 may process the PBCH payloads at each buffer position of buffers 604 and 608 to compensate for the differing system frame numbers in stage 514. As the channel code for 5G NR is a linear code, combiner 306 may be able to revert the effects of the different system frame number fields in each of the combined PBCH payloads. In other words, as the channel code used for the PBCH payloads is linear, it is possible to determine the exact effects on an encoded codeword that stem from a given bit of the original payload. As the MSBs of the system frame numbers of the combined PBCH payloads are the same, combiner 306 may revert the effects of the differences between the three LSBs of the system frame numbers in the combined PBCH payloads. Combiner 306 may therefore, for each of buffers 604 and 606, assume that the hypothesis system frame number is correct (e.g., that the combined PBCH payload in $HF_n$ has a system frame number ending in 111, the combined PBCH payload in $HF_{n-2}$ has a system frame number ending in 110, and so forth) and revert the effects of the differing system frame number LSBs. For example, when the linear channel code is polar coding (e.g., as in 5G NR), combiner 306 may revert the effects of a given LSB having a hypothesized value of 1 by reversing the polarity (e.g., sign) of all bits in the encoded payload that depend on the LSB. Combiner 306 may repeat this for each LSB. After compensating for the hypothesis system frame numbers in a given buffer, combiner 306 may combine the compensated PBCH payloads to obtain a combined compensated PBCH payload.

In some aspects, combiner 306 may perform this compensation in an alternating manner between buffers 604 and 606. For example, as combiner 306 may obtain a new combined PBCH payload for each half-frame, combiner 306 may alternate between inserting a combined PBCH payload from one half-frame into buffer 604 and then inserting a combined PBCH payload from the next half-frame into buffer 606 (where buffers 604 and 606 may receive new PBCH payloads every-other half-frame in an alternating manner). Accordingly, in some aspects combiner 306 may perform the compensation for a given buffer whenever combiner 306 inserts a new combined PBCH payload into the buffer. For example, combiner 306 may obtain a new combined PBCH payload for a first half-frame (by combining PBCH payloads from SSBs in this first half-frame) and insert the new combined PBCH payload into buffer 604 (and push out the last PBCH payload, e.g., from the oldest half-frame) in stage 512. Combiner 306 may then compensate the PBCH payloads at each buffer position according to their respective hypothesis system frame numbers in stage 514. Combiner 306 may then combine the compensated PBCH payloads at each buffer position of buffer 604 in stage 516 and provide the combined compensated PBCH payload to decoder 308.

Decoder 308 may then attempt to decode the combined compensated PBCH payload in stage 518. As the combined compensated PBCH payload is a combination of multiple PBCH payloads, this combined compensated PBCH payload may have improved SINR compared to a single PBCH payload. However, as the hypothesis system frame numbers at each buffer position in buffer 604 are hypotheses, they may not be correct. For example, the three LSBs of the actual system frame number of the PBCH payload in buffer position (n) may not be "111", but may instead be another set of three LSBs (e.g., any of "000"-"110"). Accordingly, the compensation performed by combiner 306 may not be correct. If decoder 308 achieves a successful decode in stage 520 (e.g., the decoded PBCH payload passes the error check), controller 310 may conclude that that hypothesis system frame numbers at each buffer position in buffer 604 were correct. In other words, the combined PBCH payloads at each buffer position had an actual system frame number with its three LSBs matching the hypothesis system frame number.

However, if the hypothesis system frame numbers for the buffer positions of buffer 604 are incorrect, the compensation performed by combiner 306 may be incorrect and the decode may fail. For example, the actual three LSBs of the system frame number of the combined PBCH payload at buffer position (n) may have been "010," while the hypothesis system frame number used by combiner 306 for the compensation was "111." Combiner 306 may therefore not be able to achieve correct compensation for the system frame numbers until the PBCH payload currently at buffer position (n) has shifted to buffer position (n–10), which has the correct hypothesis system frame number.

Accordingly, if the decode attempt from the combined compensated PBCH payload from buffer 604 fails, controller 310 may trigger another decode attempt, and RS detector 302, descrambler 304, and combiner 306 may repeat stages 506-512 for the next half-frame. Combiner 306 may therefore obtain a combined PBCH payload from the next half-frame and insert this combined PBCH payload into buffer 606 (which may push out the combined PBCH payload from the oldest half-frame and shift the remaining combined PBCH payloads down one position). Combiner 306 may then repeat the procedure of compensating the combined PBCH payloads in buffer 606 according to their respective hypothesis system frame numbers in stage 514. Combiner 306 may then in stage 516 combine the compensated PBCH payloads to obtain a combined compensated PBCH payload and provide the combined compensated PBCH payload to decoder 308. Decoder 308 may then attempt to decode the combined compensated PBCH payload in stage 518. If the decode is successful, controller 310 may assume that the hypothesis system frame numbers for the current buffer positions were correct, and may take the decoded PBCH payload as the correct decoded PBCH payload. Conversely, if the decode is not successful, controller 310 may trigger another decode attempt using the combined PBCH payload from the next half-frame, which combiner 306 may insert into buffer 604 (and push out the combined PBCH payload from the oldest half-frame while shifting the remaining combined PBCH payloads to the next buffer position).

RS detector 302, descrambler 304, combiner 306, broadcast channel decoder 308, and controller 310 may therefore continue to obtain combined PBCH payloads over a plurality of half-frames and to insert the combined PBCH payloads into buffers 604 and 606 in an alternating manner. Combiner 306 may similarly alternate between compensating and combining the combined PBCH payloads in buffers 604 and 606 and providing the resulting combined compensated PBCH payloads to broadcast channel decoder 308. Once broadcast channel decoder 308 achieves a successful decode on a combined compensated PBCH payload from either buffer 604 or 606, broadcast channel decoder 308 may notify controller 310. Controller 310 may then end the PBCH decoding process and may provide the decoded PBCH payload to other components of baseband modem 206 for further processing. For example, protocol controller 210 of baseband modem 210 may extract important data from the decoded PBCH payload, such as the MIB and/or system frame number, and may use this data for subsequent interaction or communication with the cell that transmitted the PBCH.

Figure 8:
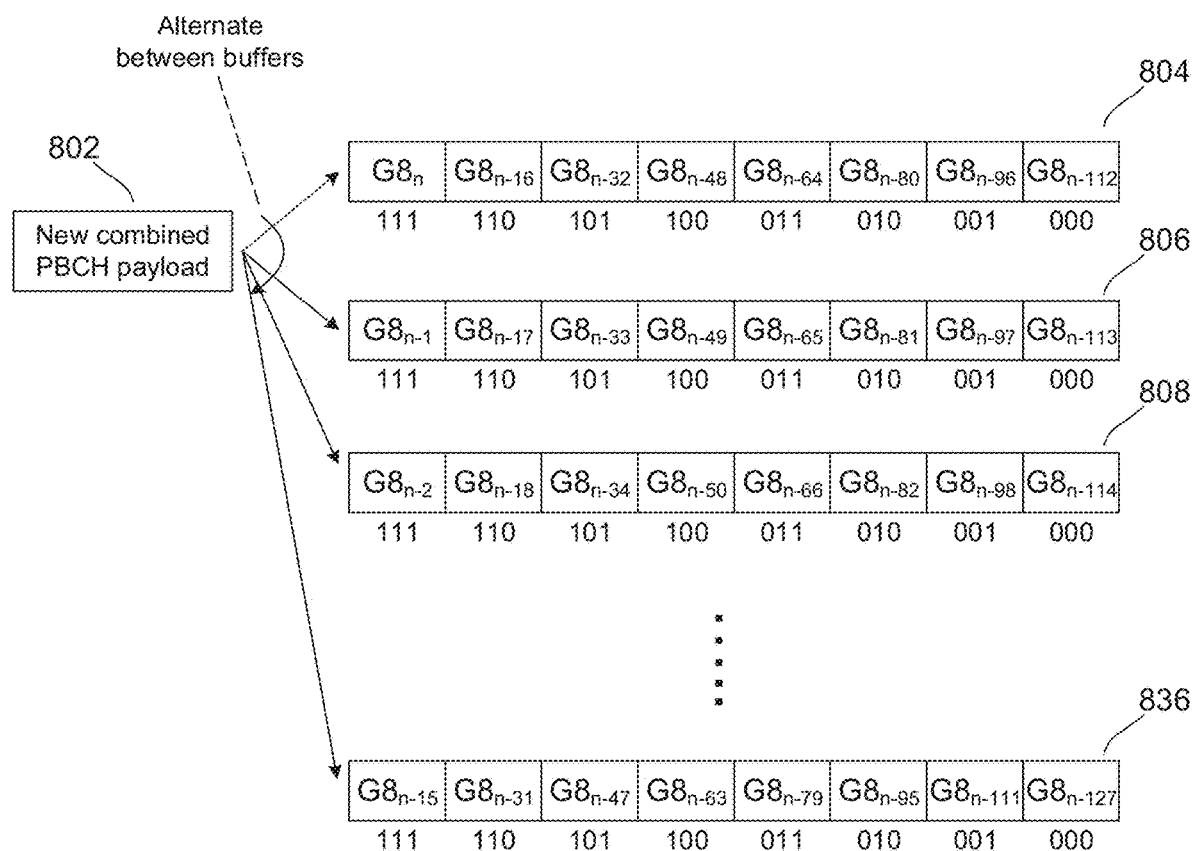
FIG. 8 shows an exemplary buffer configuration for compensating and combining broadcast channel payloads using sixteen buffers according to some aspects.

FIG. 7 shows another exemplary buffering configuration according to some aspects. As shown in FIG. 7, in some aspects combiner 306 may use a single buffer 704, into which combiner 306 may insert each new combined PBCH payload (denoted as 702). Accordingly, instead of having two buffers that collectively hold the combined PBCH payloads from the last M half-frames, buffer 306 may individually hold the combined PBCH payloads from the last M half-frames. Every other combined PBCH payload will therefore be from a different frame. As shown in FIG. 8, combiner 306 may use hypothesis system frame number "111" for both buffer positions (n) and (n–1), hypothesis frame number "110" for both buffer positions (n–2) and (n–3), and so forth. In other words, the hypothesis system frame numbers may be arranged to have the same hypothesis system frame numbers for pairs of neighboring buffer positions. Combiner 306 may utilize buffer 704 in a similar manner as to buffers 604 and 606 and may continue to insert the combined PBCH payload from the last half-frame into the first buffer position and shift the remaining combined PBCH payloads towards the outer end of the buffer. Combiner 306 may then compensate the combined PBCH payloads according to the hypothesis system frame numbers of their respective buffer positions and combine the compensated PBCH payloads to obtain a combined compensated PBCH payload. Combiner 306 may then provide this combined compensated payload to broadcast channel decoder 308 for decoding. If the hypothesis system frame numbers are incorrect for the combined PBCH payloads at each buffer position (e.g., if the combined PBCH payload at buffer positions (n) and (n–1) do have system frame numbers ending in "111," and so forth throughout the remaining buffer positions), the decode may fail. Once the combined PBCH payloads are at buffer positions that match up with their actual system frame numbers, broadcast channel decoder 308 may decode the compensated combined PBCH payload successfully.

As previously indicated, this buffer technique illustrated in FIGS. 6 and 7 may be used for L=8 cases in 5G NR. This buffer technique could also be used for L=4 cases, although it may not be necessary as terminal device 102 may be already be able to determine which SSBs are in which frame. This case is discussed further below.

FIG. 8 shows another exemplary buffering configuration according to some aspects. In some cases, combiner 306 may utilize the buffering configuration of FIG. 8 when L=64. As shown in FIG. 8, combiner 306 may include sixteen buffers 804-836. As previously described for the L=64 cases of FIG. 4, combiner 306 may be configured to combine the PBCH payloads from SSBs falling within the same SSBG8. Accordingly, after combining the PBCH payload of the initial SSBG8 with the PBCH payloads of the subsequent SSBG8s falling within the combination time interval, combiner 308 may place the new combined PBCH payload (denoted as 802) in buffer 804. RS detector 302, descrambler 304, and combiner 306 may then repeat stages 506-512, and may therefore detect and combine the PBCH payloads from the SSBs in the next SSBG8 (e.g., starting from the first SSB in this next SSBG8 and using a combination time interval that includes the entire SSBG8). Combiner 306 may then insert this combined PBCH payload into buffer 806. Combiner 306 may proceed to insert combined PBCH payloads into buffers 806-836, and may then cycle back to buffer 804. Combiner 306 may continue to fill buffers 804-836 with combined PBCH payloads in this cyclical manner. Once buffers 804-836 are filled (e.g., after 128 SSBG8s have passed), combiner 306 may proceed to stage 514 and may compensate for the hypothesis frame numbers in buffers 804-832. In some aspects, combiner 306 may perform this compensation in an alternating manner. For example, once a combined PBCH payload from a given SSBG8 is inserted into one of buffers 804-832, combiner 306 may compensate for the hypothesis frame numbers with the PBCH payloads stored in that buffer, and then combine the compensated PBCH payloads in that buffer to obtain a combined compensated PBCH payload in stage 516. If broadcast channel decoder 308 fails to successfully decode the combined compensated PBCH payload, combiner 306 may then insert the combined PBCH payload from the next SSBG8 into the next buffer in the sequential cycle in stage 512. Combiner 308 may then compensate for the hypothesis frame numbers in this buffer and obtain a combined compensated PBCH payload in stage 516, which broadcast channel decoder 308 may then attempt to decode. Combiner 308 may therefore cycle between buffers 804-832.

As there are 8 SSBG8s per half-frame and 16 SSBG8s per frame, consecutive PBCH payloads in each of buffers 804-836 will be from different frames. For example, the system frame number for the combined PBCH payload in buffer position (n) in buffer 804 will be one less than the system frame number for the combined PBCH payload in buffer position (n−16), and so forth throughout the buffer positions of buffer 804. Accordingly, because combiner 306 is configured to continually insert the combined PBCH payloads from the most recent SSBG8s into buffers 804-836, and to shift the PBCH payloads in buffers 804-836 towards the end of the buffers, the system frame numbers of the combined PBCH payloads will eventually line up in buffer positions having the correct hypothesis system frame numbers. When this occurs and broadcast channel decoder 308 attempts to decode the resulting combined compensated PBCH payload, broadcast channel decoder 308 may be able to successfully decode the combined compensated PBCH payload in stage 518.

In some aspects, combiner 306 may alternatively be configured to use a single buffer of size-128 for L=64 cases. In these aspects, the hypothesis frame numbers may be arranged so that the first 8 buffer positions have hypothesis system frame numbers of "111," the second 8 buffer positions have hypothesis system frame numbers of "110," the third 8 buffer positions have hypothesis system frame numbers of "101," and so forth. Combiner 306 may therefore insert a new combined PBCH payload from each successive SSBG8, compensate the combined PBCH payloads at each buffer position according to their respective hypothesis system frame numbers, combine the compensated PBCH payloads, and provide the combined compensated PBCH payload to broadcast channel decoder 308. Eventually, the combined PBCH payloads at each buffer position may line up with the correct hypothesis system frame number, and broadcast channel decoder 308 may achieve a successful decode.

Accordingly, the various buffer configurations shown in FIGS. 6-8 may enable terminal device 102 to combine PBCH payloads from different half-frames and frames. As combiner 306 may as a result be able to combine greater numbers of PBCH payloads, the resulting combined compensated PBCH payloads may have higher SINR. Broadcast channel decoder 308 may therefore be able to improve decoding performance. These buffer configurations are non-limiting, and there exist numerous variations where combiner 306 uses buffer combined PBCH payloads and hypothesis system frame numbers assigned to the various buffer positions to compensate for differing system frame numbers.

Figure 9:
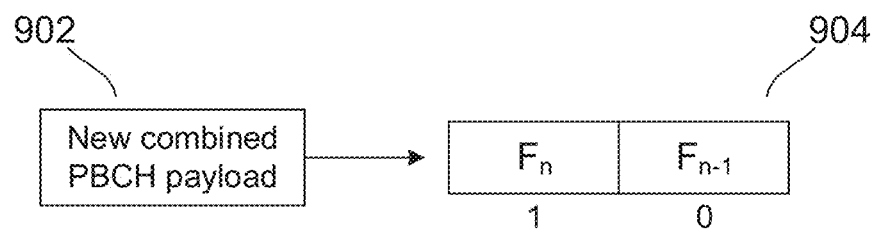
FIG. 9 shows another exemplary buffer configuration for compensating and combining broadcast channel payloads using one buffer according to some aspects.

In some aspects, terminal device 102 may utilize a similar type of system frame number compensation to combine PBCH payloads from different frames in an L=4 case. For example, terminal device 102 may be configured to use procedure 500 to combine PBCH payloads from within a first same frame, where terminal device 102 may obtain a combined PBCH payload from the SSBs in an initial frame using stages 502-512. Combiner 306 may then store the combined PBCH payload in a buffer, and may then repeat stages 506-512 to obtain a combined PBCH payload from the next frame. Combiner 306 may then compensate for the differing system frame numbers between the combined PBCH payloads from the initial and next frames, and then combine the compensated PBCH payloads to obtain a combined compensated PBCH payload. FIG. 9 shows an exemplary buffer configuration according to some aspects, where buffer 904 may be a size-2 buffer. The combined PBCH payload at buffer position (n) (e.g., where the combined PBCH payload from the next frame is stored) may have a hypothesis system frame number of "1" while the combined PBCH payload at buffer position (n−1) (e.g., where the combined PBCH payload from the initial frame is stored) may have a hypothesis system frame number of "0." In various other aspects, combiner 306 can use other buffer sizes and hypothesis system frame numbers, such as a buffer size of 4 and hypothesis system frame numbers from "11" to "00." Combiner 306 may use these buffers to compensate the combined PBCH payloads in the same manner described above, where combiner 306 may insert a new combined PBCH payload (denoted as 902) from a new frame into buffer 904, compensate the combined PBCH payloads according to their respective hypothesis system frame numbers, combine the compensated PBCH payloads, and send the combined compensated PBCH payload to broadcast channel decoder 308 for decoding. If the decode fails, combiner 306 may push a new combined PBCH payload into buffer 904, shift out the oldest entry (e.g., according to a FIFO operation), and repeat the compensation and combining procedure.

Figure 10:
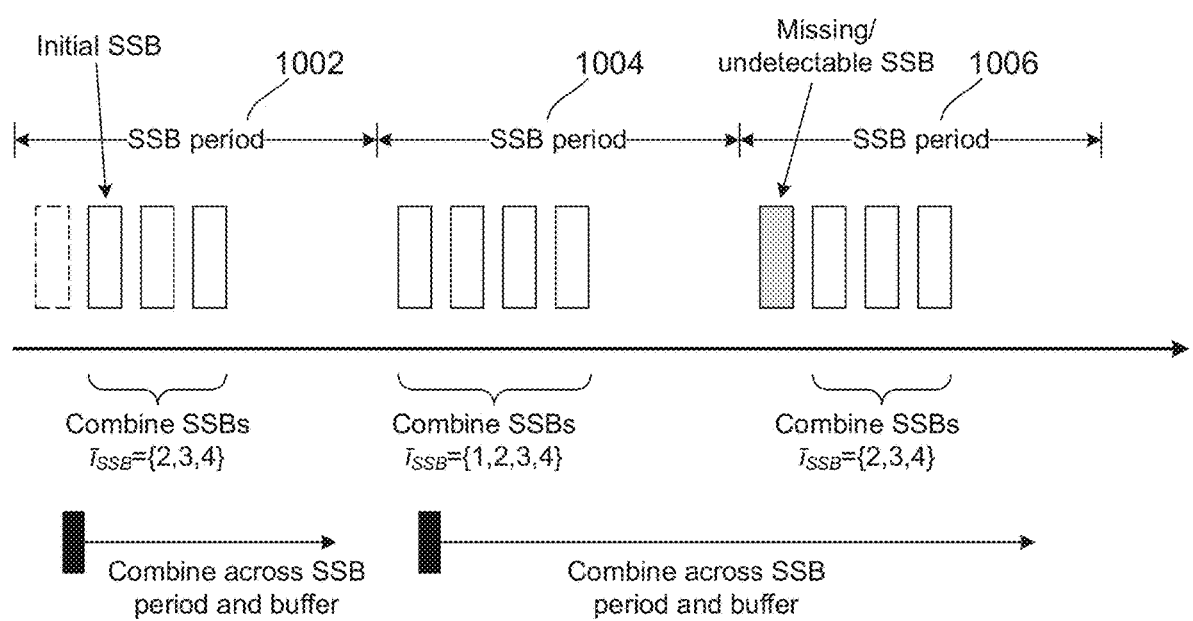
FIG. 10 shows a conceptual diagram of combining broadcast channel payloads according to some aspects.

FIG. 10 shows an exemplary conceptual diagram of SSB combination across various SSB periods according to some aspects. In the example of FIG. 10, the SSB pattern size L may be 4; however, the same concepts also apply to the other possible values of L. As shown in FIG. 10, RS detector 302 may detect the second SSB in SSB period 1002 (e.g., a half-frame), which may be the initial SSB. RS detector 302 may determine that the initial SSB has a DMRS index $\bar{\iota}_{SSB}=2$ and that the initial SSB is located in the second half-frame of its frame. Controller 310 may therefore determine the combination time interval $T_{CC}$ to include the initial SSB and the remaining SSBs in the half-frame, namely SSBs with DMRS indices $\bar{\iota}_{SSB}=\{2, 3, 4\}$. Combiner 306 may then combine the PBCH payloads from these SSBs to obtain a combined PBCH payload from the frame and may store the combined PBCH payload in a buffer.

Then, in the next frame detector 302 may detect the first SSB in SSB period 1004 (e.g., the next half-frame following SSB period 1002). As this SSB is in the first half-frame of its frame, combiner 306 may be able to combine all SSBs in SSB period 1004 and all SSBs in SSB period 1006. Accordingly, controller 310 may determine the combination time interval $T_{CC}$ to include all SSBs in SSB periods 1004 and 1006. As these SSBs are detected, combiner 306 may combine their PBCH payloads. As shown in FIG. 10, RS detector 302 may detect all of the SSBs in SSB period 1004 (with DMRS indices $\bar{\iota}_{SSB}=\{1, 2, 3, 4\}$), which combiner 306 may combine as part of the combined PBCH payload. In the example of FIG. 10, RS detector 302 may only detect three of the SSBs in SSB period 1006, such as where the SSB at DMRS index $\bar{\iota}_{SSB}=1$ is either undetectable (e.g., due to poor radio conditions) or was not transmitted by the cell. Accordingly, combiner 306 may combine the four detected SSBs from SSB period 1004 with the three detected SSBs from SSB period 1006 to obtain the combined PBCH payload. Combiner 306 may then utilize a buffer-based system frame number compensation technique, such as that described in FIG. 9, to compensate for the differing system frame numbers between these combined PBCH payloads.

The various techniques for broadcast channel decoding may provide various technical benefits to terminal device 102. For example, during an initial cell search, it may be desirable for the terminal device to minimize the amount of time involved in acquiring frame timing (e.g., to decode the PBCH and obtain the SFN). For neighbor cell search and measurement, the terminal device may be required by the standard to satisfy certain minimum performance requirements. For example, the 5G NR standard may dictate that the terminal device acquire frame timing for a newly identified inter-frequency cell on a millimeter wave carrier frequency (denoted as Frequency Range 2 (FR2)) within a time interval $T_{SSB\_time\_index}$ (e.g., as specified in 3GPP TS 38.133). Accordingly, these broadcast channel decoding techniques may in some cases enable terminal device 102 to achieve these performance requirements. Furthermore, in some cases these broadcast channel decoding techniques may improve the call drop rate of terminal device 102 when performing handovers, which may in turn improve user experience. These broadcast channel decoding techniques may also improve power savings, such as by limiting the number of decoding attempts for SSBs with low SINR. For example, if terminal device 102 attempted to decode the PBCH payload from single SSBs with low SINR, terminal device 102 may experience a high rate of decoding failure and wasted computing power.

Figure 11:
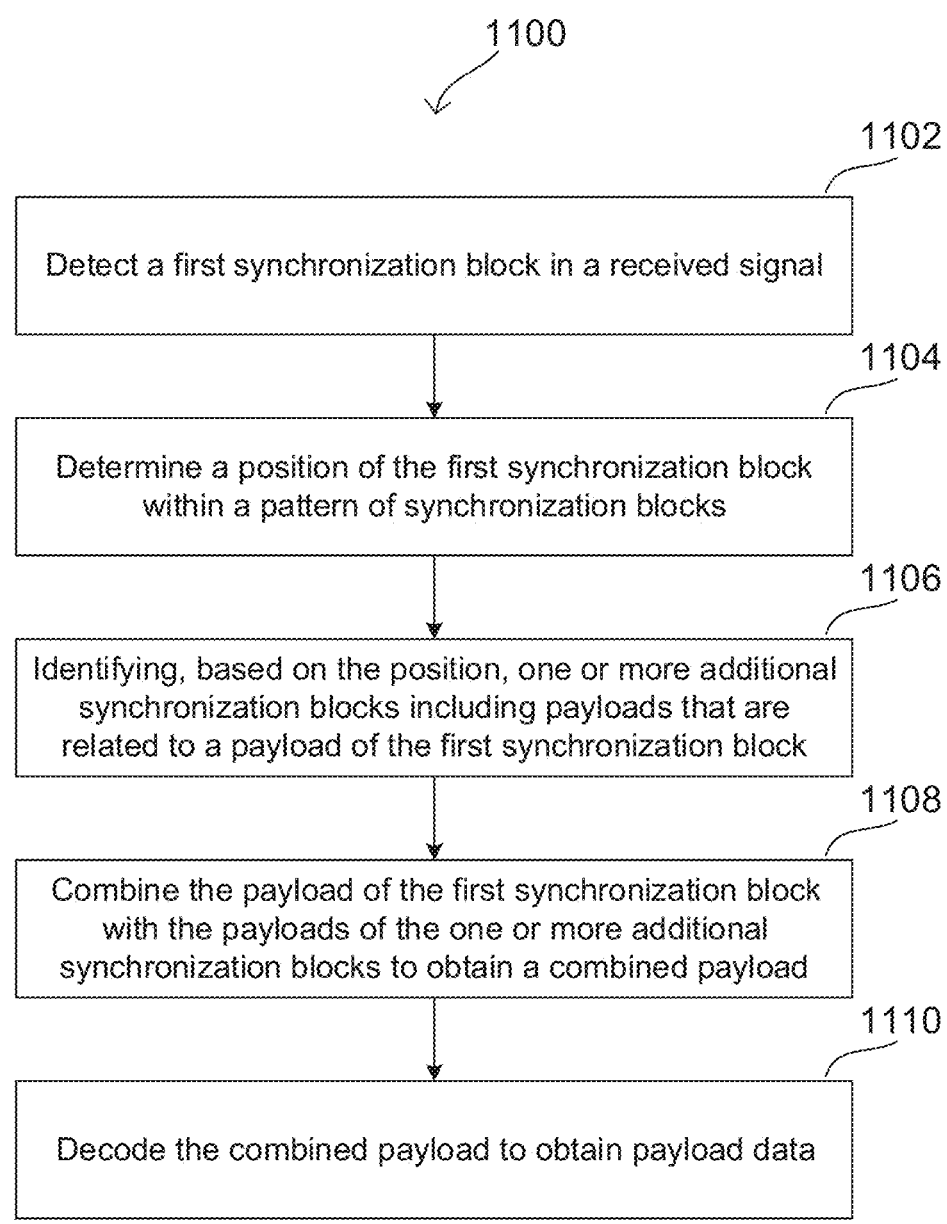
FIG. 11 shows an exemplary method of performing wireless communications according to some aspects.

FIG. 11 shows exemplary method 1100 according to some aspects. As shown in FIG. 11, method 1100 may include detecting a first synchronization block in a received signal (1102), determining a position of the first synchronization block within a pattern of synchronization blocks (1104), identifying, based on the position, one or more additional synchronization blocks including payloads that are related to a payload of the first synchronization block (1106), combining the payload of the first synchronization block with the payloads of the one or more additional synchronization blocks to obtain a combined payload (1108), and decoding the combined payload to obtain payload data (1110).

Figure 12:
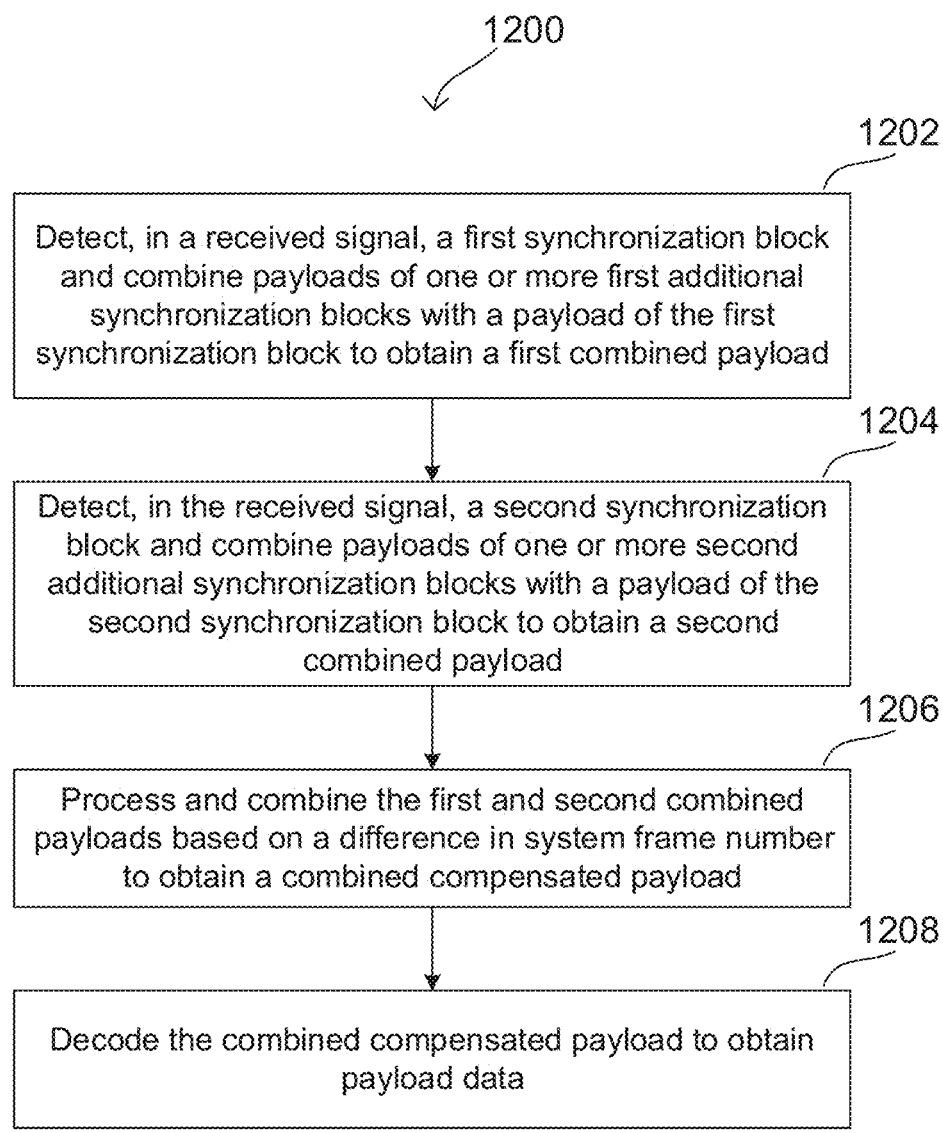
FIG. 12 shows an exemplary method of performing wireless communications according to some aspects.

FIG. 12 shows exemplary method 1200 according to some aspects. As shown in FIG. 12, method 1200 may include detecting, in a received signal, a first synchronization block and combining payloads of one or more first additional synchronization blocks with a payload of the first synchronization block to obtain a first combined payload (1202), detecting, in the received signal, a second synchronization block and combining payloads of one or more second additional synchronization blocks with a payload of the second synchronization block to obtain a second combined payload (1204), processing and combining the first and second combined payloads based on a difference in system frame number to obtain a combined compensated payload (1206), and decoding the combined compensated payload to obtain payload data (1208).

In some aspects of this disclosure, a wireless communication device (e.g., terminal device 102, baseband modem 206, or a subcomponent of baseband modem 206) may include a reference signal detector (e.g., RS detector 302) configured to detect a first synchronization block in a received signal and to determine a position of the synchronization block within a pattern of synchronization blocks, a controller (e.g., controller 310) configured to identify, based on the position, one or more additional synchronization blocks including payloads that are related to a payload of the first synchronization block, a combiner (e.g., combiner 306) configured to combine the payload of the first synchronization block with the payloads of the one or more additional synchronization blocks to obtain a combined payload, and a decoder (e.g., decoder 308) configured to decode the combined payload to obtain payload data.

In some aspects of this disclosure, a wireless communication device (e.g., terminal device 102, baseband modem 206, or a subcomponent of baseband modem 206) may include a reference signal detector (e.g., RS detector 302) configured to detect, in a received signal, a first synchronization block and a second synchronization block, a combiner (e.g., combiner 306) configured to combine a payload of the first synchronization block with payloads of one or more first synchronization blocks to obtain a first combined payload, to combine a payload of the second synchronization block with payloads of one or more second synchronization blocks to obtain a second combined payload, the combiner further configured to process and combine the first and second combined payloads based on a difference in system frame number to obtain a combined compensated payload, and a decoder (e.g., decoder 308) configured to decode the combined compensated payload to obtain payload data.

While the above descriptions used various 5G NR numerologies as exemplary use cases, the use of these specific examples serve to enhance the clarity of the description and do not limit the applicability or scope of the techniques described herein. Accordingly, these broadcast channel decoding techniques can be applied to any numerology and/or any radio access technology. In various additional aspects of this disclosure, the SSBs can be generalized to any synchronization block, the SSB patterns can be generalized to any pattern of synchronization blocks, the SSB indices can be generalized any position index within a pattern of synchronization blocks, the DMRSs can be generalized to any demodulation reference signal, the DMRS indices can be generalize to any identifying index for any demodulation reference signal, the PSSs and SSSs can be generalized to any synchronization signals, the PBCHs can be generalized to any type of broadcast channel, the OFDM symbols can be generalized to any type of baseband symbols, and so forth.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a wireless communication device including a reference signal detector configured to detect a first synchronization block in a received signal and to determine a position of the synchronization block within a pattern of synchronization blocks, a controller configured to identify, based on the position, one or more additional synchronization blocks including payloads that are related to a payload of the first synchronization block, a combiner configured to combine the payload of the first synchronization block with the payloads of the one or more additional synchronization blocks to obtain a combined payload, and a decoder configured to decode the combined payload to obtain payload data.

In Example 2, the subject matter of Example 1 can optionally further include one or more antennas and a radio transceiver, wherein the one or more antennas and the radio transceiver are configured to receive and process radio signals to obtain the received signal.

In Example 3, the subject matter of Example 1 or 2 can optionally include wherein the reference signal detector is configured to detect the first synchronization block by detecting a reference signal in the received signal.

In Example 4, the subject matter of Example 3 can optionally include wherein the reference signal detector is configured to determine the position of the synchronization block by matching the reference signal with a predefined reference signal that is paired with the position.

In Example 5, the subject matter of any one of Examples 1 to 4 can optionally include wherein the pattern of synchronization blocks has a predefined duration and a predefined set of position indices for synchronization blocks in the pattern.

In Example 6, the subject matter of any one of Examples 1 to 5 can optionally include wherein the position represents an indexed position of the synchronization block within the entire pattern of synchronization blocks.

In Example 7, the subject matter of any one of Examples 1 to 5 can optionally include wherein the position represents an indexed position of the synchronization block within a subset of the pattern of synchronization blocks.

In Example 8, the subject matter of any one of Examples 1 to 7 can optionally include wherein the controller is configured to identify the one or more additional synchronization blocks by identifying, based on the position, one or more synchronization blocks that are also within the pattern of synchronization blocks as the one or more additional synchronization blocks.

In Example 9, the subject matter of Example 7 can optionally include wherein the controller is further configured to determine a combination time interval in the received signal that includes the first synchronization block and the one or more additional synchronization blocks.

In Example 10, the subject matter of any one of Examples 1 to 8 can optionally further include a descrambler configured to descramble the payload of the first synchronization block and the payloads of the one or more additional synchronization blocks.

In Example 11, the subject matter of Example 9 can optionally include wherein the combiner is configured to combine the payload of the first synchronization block with the payloads of the one or more additional synchronization blocks after the descrambler descrambles the payload of the first synchronization block and the payloads of the one or more additional synchronization blocks.

In Example 12, the subject matter of any one of Examples 1 to 10 can optionally include wherein the combiner is configured to combine the payload of the first synchronization block with the payloads of the one or more additional synchronization blocks using soft-combining.

In Example 13, the subject matter of any one of Examples 1 to 10 can optionally include wherein the combiner is configured to combine the payload of the first synchronization block with the payloads of the one or more additional synchronization blocks using chase-combining.

In Example 14, the subject matter of any one of Examples 1 to 12 can optionally include wherein the payload of the first synchronization block and the payloads of the one or more additional synchronization blocks include a system frame number field that is the same value.

In Example 15, the subject matter of any one of Examples 1 to 13 can optionally further include a protocol controller configured to control communication with a cell that transmitted the first synchronization block based on the payload data.

In Example 16, the subject matter of any one of Examples 1 to 14 can optionally include wherein the payload data is broadcast channel data for a cell that transmitted the first synchronization block.

In Example 17, the subject matter of any one of Examples 1 to 15 can optionally include wherein the first synchronization block is a Synchronization Signal and Physical Broadcast Channel (SS/PBCH) block (SSB) and the payload data is PBCH data.

In Example 18, the subject matter of any one of Examples 1 to 16 can optionally include wherein the combiner is further configured to combine a payload of a second synchronization block with payloads of one or more second additional synchronization blocks to obtain a second combined payload, and to process and combine the first and second combined payloads based on a difference in system frame numbers to obtain a combined compensated payload, and wherein the decoder is configured to decode the combined payload by decoding the combined compensated payload.

In Example 19, the subject matter of Example 17 can optionally include wherein the second synchronization block and the one or more second additional synchronization blocks are from a different pattern of synchronization blocks than the first synchronization block and the one or more additional synchronization blocks.

In Example 20, the subject matter of Example 17 can optionally include wherein the second synchronization block and the one or more second additional synchronization blocks are from a different radio frame than the first synchronization block and the one or more additional synchronization blocks.

In Example 21, the subject matter of Example 17 can optionally include wherein the second synchronization block and the one or more second additional synchronization blocks have a different system frame number than the first synchronization block and the one or more additional synchronization blocks.

Example 22 is a wireless communication device including a reference signal detector configured to detect, in a received signal, a first synchronization block and a second synchronization block, a combiner configured to combine a payload of the first synchronization block with payloads of one or more first synchronization blocks to obtain a first combined payload, to combine a payload of the second synchronization block with payloads of one or more second synchronization blocks to obtain a second combined payload, the combiner further configured to process and combine the first and second combined payloads based on a difference in system frame number to obtain a combined compensated payload, and a decoder configured to decode the combined compensated payload to obtain payload data.

In Example 23, the subject matter of Example 21 can optionally further include one or more antennas and a radio transceiver, wherein the one or more antennas and the radio transceiver are configured to receive and process radio signals to obtain the received signal.

In Example 24, the subject matter of Example 21 or 22 can optionally include wherein the reference signal detector is configured to detect the first synchronization block by detecting a reference signal in the received signal.

In Example 25, the subject matter of any one of Examples 21 to 23 can optionally include the reference signal detector further configured to determine a position of the first synchronization block within a pattern of synchronization blocks, and further including a controller configured to identify the one or more first synchronization blocks based on the position.

In Example 26, the subject matter of Example 24 can optionally include wherein the reference signal detector is configured to determine the position of the first synchronization block by matching the reference signal with a predefined reference signal that is paired with the position.

In Example 27, the subject matter of Example 24 can optionally include wherein the controller is configured to identify the one or more first synchronization blocks by identifying, based on the position, one or more synchronization blocks that are also within the pattern of synchronization blocks.

In Example 28, the subject matter of any one of Examples 21 to 26 can optionally further include a descrambler configured to descramble the payload of the first synchronization block and the payloads of the one or more first synchronization blocks, wherein the combiner is configured to combine the first synchronization block with the one or more first synchronization blocks after the descrambling.

In Example 29, the subject matter of any one of Examples 21 to 27 can optionally include wherein the combiner is configured to combine the first synchronization block with the one or more first synchronization blocks using soft-combining.

In Example 30, the subject matter of any one of Examples 21 to 27 can optionally include wherein the combiner is configured to combine the first synchronization block with the one or more first synchronization blocks using chase-combining.

In Example 31, the subject matter of any one of Examples 21 to 29 can optionally include wherein the payload of the first synchronization block and the payloads of the one or more first synchronization blocks include a system frame number field that is the same value.

In Example 32, the subject matter of Example 30 can optionally include wherein the system frame number field of the first synchronization block and the payloads of the one or more first synchronization blocks is different from a system frame number field of the payload of the second synchronization block and the payloads of the one or more second synchronization blocks.

In Example 33, the subject matter of any one of Examples 21 to 31 can optionally further include a protocol controller configured to control communication between the wireless communication device and a cell that transmitted the first synchronization block based on the payload data.

In Example 34, the subject matter of any one of Examples 21 to 32 can optionally include wherein the payload data is broadcast channel data for a cell that transmitted the first synchronization block.

In Example 35, the subject matter of any one of Examples 21 to 33 can optionally include wherein the first synchronization block is a Synchronization Signal and Physical Broadcast Channel (SS/PBCH) block (SSB) and the payload data is PBCH data.

In Example 36, the subject matter of any one of Examples 21 to 34 can optionally include wherein the combiner is configured to process and combine the first and second combined payloads by placing the first combined payload in a buffer at a first buffer position having a first hypothesis system frame number, placing the second combined payload in the buffer at a second buffer position having a second hypothesis frame number, compensating the first and second combined payloads based on the first and second hypothesis system frame numbers to obtain a first compensated payload and a second compensated payload, and combining the first and second compensated payloads to obtain the combined compensated payload.

In Example 37, the subject matter of Example 35 can optionally include wherein the combiner is configured to compensate the first and second combined payloads by reverting effects of a difference between the first and second hypothesis system frame numbers to obtain the first and second compensated payloads.

In Example 38, the subject matter of Example 35 can optionally include wherein the first and second combined payloads are encoded with a linear code, and wherein the combiner is configured to compensate the first and second combined payloads by reverting effects of the linear code related to different system frame number fields in the first and second combined payloads.

In Example 39, the subject matter of any one of Examples 35 to 37 can optionally include wherein, if the decode is unsuccessful, the combiner is further configured to shift the first combined payload to a new first buffer position having a new first hypothesis system frame number and shift the second combined payload to a new second buffer position having a new first hypothesis system frame number, insert a third combined payload into the buffer at a third position having a third hypothesis system frame number, compensate the first, second, and third combined payloads based on the new first hypothesis system frame number, the new second hypothesis system frame number, and the third hypothesis system frame number to obtain a new first compensated payload, a new second compensated payload, and a third compensated payload, and combine the new first compensated payload, the new second compensated payload, and the third compensated payload to obtain a new combined compensated payload.

In Example 40, the subject matter of Example 38 can optionally include wherein the decoder is configured to decode the new combined compensated payload to obtain new payload data.

In Example 41, the subject matter of any one of Examples 21 to 39 can optionally include wherein the decoder is further configured to perform an error check on the payload data to determine whether the decode was successful.

Example 42 is a method of performing wireless communications at a wireless device, the method including detecting a first synchronization block in a received signal, determining a position of the first synchronization block within a pattern of synchronization blocks, identifying, based on the position, one or more additional synchronization blocks including payloads that are related to a payload of the first synchronization block, combining the payload of the first synchronization block with the payloads of the one or more additional synchronization blocks to obtain a combined payload, and decoding the combined payload to obtain payload data.

In Example 43, the subject matter of Example 41 can optionally further include receiving the received signal via one or more antennas and a radio transceiver.

In Example 44, the subject matter of Example 41 or 42 can optionally include wherein detecting the first synchronization block includes detecting a reference signal in the received signal.

In Example 45, the subject matter of Example 43 can optionally include wherein determining the position of the synchronization block includes matching the reference signal with a predefined reference signal that is paired with the position.

In Example 46, the subject matter of any one of Examples 41 to 45 can optionally include wherein the pattern of synchronization blocks has a predefined duration and a predefined set of position indices for synchronization blocks in the pattern.

In Example 47, the subject matter of any one of Examples 41 to 46 can optionally include wherein the position represents an indexed position of the synchronization block within the entire pattern of synchronization blocks.

In Example 48, the subject matter of any one of Examples 41 to 46 can optionally include wherein the position represents an indexed position of the synchronization block within a subset of the pattern of synchronization blocks.

In Example 49, the subject matter of any one of Examples 41 to 48 can optionally include wherein identifying the one or more additional synchronization blocks includes identifying, based on the position, one or more synchronization blocks that are also within the pattern of synchronization blocks as the one or more additional synchronization blocks.

In Example 50, the subject matter of Example 46 can optionally further include determining a combination time interval that includes the first synchronization block and the one or more additional synchronization blocks.

In Example 51, the subject matter of any one of Examples 41 to 47 can optionally further include descrambling the payload of the first synchronization block and the payloads of the one or more additional synchronization blocks.

In Example 52, the subject matter of Example 48 can optionally include wherein combining the payload of the first synchronization block with the payloads of the one or more additional synchronization blocks is performed after descrambling the payload of the first synchronization block and the payloads of the one or more additional synchronization blocks.

In Example 53, the subject matter of any one of Examples 41 to 49 can optionally include wherein combining the payload of the first synchronization block with the payloads of the one or more additional synchronization blocks includes combining the payload of the first synchronization block with the payloads of the one or more additional synchronization blocks with soft-combining.

In Example 54, the subject matter of any one of Examples 41 to 49 can optionally include wherein combining the payload of the first synchronization block with the payloads of the one or more additional synchronization blocks includes combining the payload of the first synchronization block with the payloads of the one or more additional synchronization blocks with chase-combining.

In Example 55, the subject matter of any one of Examples 41 to 51 can optionally include wherein the payload of the first synchronization block and the payloads of the one or more additional synchronization blocks include a system frame number field that is the same value.

In Example 56, the subject matter of any one of Examples 41 to 52 can optionally further include controlling communication with a cell that transmitted the first synchronization block based on the payload data.

In Example 57, the subject matter of any one of Examples 41 to 53 can optionally include wherein the payload data is broadcast channel data for a cell that transmitted the first synchronization block.

In Example 58, the subject matter of any one of Examples 41 to 54 can optionally include wherein the first synchronization block is a Synchronization Signal and Physical Broadcast Channel (SS/PBCH) block (SSB) and the payload data is PBCH data.

In Example 59, the subject matter of any one of Examples 41 to 55 can optionally further include combining a payload of a second synchronization block with payloads of one or more second additional synchronization blocks to obtain a second combined payload, and processing and combining the first and second combined payloads based on a difference in system frame numbers to obtain a combined compensated payload, wherein decoding the combined payload includes decoding the combined compensated payload.

In Example 60, the subject matter of Example 56 can optionally include wherein the second synchronization block and the one or more second additional synchronization blocks are from a different pattern of synchronization blocks than the first synchronization block and the one or more additional synchronization blocks.

In Example 61, the subject matter of Example 56 can optionally include wherein the second synchronization block and the one or more second additional synchronization blocks are from a different radio frame than the first synchronization block and the one or more additional synchronization blocks.

In Example 62, the subject matter of Example 56 can optionally include wherein the second synchronization block and the one or more second additional synchronization blocks have a different system frame number than the first synchronization block and the one or more additional synchronization blocks.

Example 63 is a method of performing wireless communications at a wireless device, the method including detecting, in a received signal, a first synchronization block and combining payloads of one or more first additional synchronization blocks with a payload of the first synchronization block to obtain a first combined payload, detecting, in the received signal, a second synchronization block and combining payloads of one or more second additional synchronization blocks with a payload of the second synchronization block to obtain a second combined payload, processing and combining the first and second combined payloads based on a difference in system frame number to obtain a combined compensated payload, and decoding the combined compensated payload to obtain payload data.

In Example 64, the subject matter of Example 60 can optionally include receiving the received signal via one or more antennas and a radio transceiver.

In Example 65, the subject matter of Example 60 or 61 can optionally include wherein detecting the first synchronization block includes detecting a reference signal in the received signal.

In Example 66, the subject matter of any one of Examples 60 to 62 can optionally further include determining a position of the first synchronization block within a pattern of synchronization blocks, and identifying the one or more first synchronization blocks based on the position.

In Example 67, the subject matter of Example 63 can optionally include wherein determining the position of the first synchronization signal includes matching the reference signal with a predefined reference signal that is paired with the position.

In Example 68, the subject matter of Example 63 can optionally include wherein identifying the one or more first synchronization blocks includes identifying, based on the position, one or more synchronization blocks that are also within the pattern of synchronization blocks.

In Example 69, the subject matter of any one of Examples 60 to 65 can optionally further include descrambling the payload of the first synchronization block and the payloads of the one or more first synchronization blocks, wherein combining the first synchronization block with the one or more first synchronization blocks is performed after the descrambling.

In Example 70, the subject matter of any one of Examples 60 to 66 can optionally include wherein combining the first synchronization block with the one or more first synchronization blocks includes combining the first synchronization block with the one or more first synchronization blocks with soft-combining.

In Example 71, the subject matter of any one of Examples 60 to 66 can optionally include wherein combining the first synchronization block with the one or more first synchronization blocks includes combining the first synchronization block with the one or more first synchronization blocks with chase-combining.

In Example 72, the subject matter of any one of Examples 60 to 68 can optionally include wherein the payload of the first synchronization block and the payloads of the one or more first synchronization blocks include a system frame number field that is the same.

In Example 73, the subject matter of Example 69 can optionally include wherein the system frame number field of the first synchronization block and the payloads of the one or more first synchronization blocks is different from a system frame number field of the payload of the second synchronization block and the payloads of the one or more second synchronization blocks.

In Example 74, the subject matter of any one of Examples 60 to 70 can optionally further include communicating with the cell that transmitted the first synchronization block based on the payload data.

In Example 75, the subject matter of any one of Examples 60 to 71 can optionally include wherein the payload data is broadcast channel data for a cell that transmitted the first synchronization block.

In Example 76, the subject matter of any one of Examples 60 to 72 can optionally include wherein the first synchronization block is a Synchronization Signal and Physical Broadcast Channel (SS/PBCH) block (SSB) and the payload data is PBCH data.

In Example 77, the subject matter of any one of Examples 60 to 73 can optionally include wherein processing and combining the first and second combined payloads includes placing the first combined payload in a buffer at a first buffer position having a first hypothesis system frame number, placing the second combined payload in the buffer at a second buffer position having a second hypothesis frame number, compensating the first and second combined payloads based on the first and second hypothesis system frame numbers to obtain a first compensated payload and a second compensated payload, and combining the first and second compensated payloads to obtain the combined compensated payload.

In Example 78, the subject matter of Example 74 can optionally include wherein compensating the first and second combined payloads includes reverting effects of a difference between the first and second hypothesis system frame numbers to obtain the first and second compensated payloads.

In Example 79, the subject matter of Example 74 can optionally include wherein the first and second combined payloads are encoded with a linear code, and wherein compensating the first and second combined payloads including reverting effects of the linear code related to different system frame number fields in the first and second combined payloads.

In Example 80, the subject matter of any one of Examples 74 to 76 can optionally further include determining that the decode is unsuccessful, shifting the first combined payload to a new first buffer position having a new first hypothesis system frame number and shifting the second combined payload to a new second buffer position having a new first hypothesis system frame number, inserting a third combined payload into the buffer at a third position having a third hypothesis system frame number, compensating the first, second, and third combined payloads based on the new first hypothesis system frame number, the new second hypothesis system frame number, and the third hypothesis system frame number to obtain a new first compensated payload, a new second compensated payload, and a third compensated payload, and combining the new first compensated payload, the new second compensated payload, and the third compensated payload to obtain a new combined compensated payload.

In Example 81, the subject matter of Example 77 can optionally further include decoding the new combined compensated payload to obtain new payload data.

In Example 82, the subject matter of any one of Examples 60 to 78 can optionally further include performing an error check on the payload data to determine whether the decode was successful.

Example 83 is a non-transitory computer readable medium storing instructions that, when executed by one or more processors, cause the one or more processors to perform the method of any preceding Example.

Example 84 is a wireless communication device including one or more processors configured to perform the method of any preceding Example.

Example 85 is a wireless communication device including a reference signal detection means configured to detect a first synchronization block in a received signal and to determine a position of the synchronization block within a pattern of synchronization blocks, a controlling means configured to identify, based on the position, one or more additional synchronization blocks including payloads that are related to a payload of the first synchronization block, a combining means configured to combine the payload of the first synchronization block with the payloads of the one or more additional synchronization blocks to obtain a combined payload, and a decoding means configured to decode the combined payload to obtain payload data.

Example 86 is a wireless communication device including a reference signal detection means configured to detect, in a received signal, a first synchronization block and a second synchronization block, a combining means configured to combine a payload of the first synchronization block with payloads of one or more first synchronization blocks to obtain a first combined payload, to combine a payload of the second synchronization block with payloads of one or more second synchronization blocks to obtain a second combined payload, the combining means further configured to process and combine the first and second combined payloads based on a difference in system frame number to obtain a combined compensated payload, and a decoding means configured to decode the combined compensated payload to obtain payload data.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless communication device comprising:
a reference signal detector configured to detect a first synchronization block in a received signal and to determine a position of the first synchronization block within a pattern of synchronization blocks, wherein the reference signal detector is configured to detect the first synchronization block by detecting a reference signal in the received signal, wherein the reference signal detector is configured to determine the position of the first synchronization block by matching the reference signal with a predefined reference signal that is paired with the position;
a controller configured to identify, based on the position, one or more additional synchronization blocks comprising payloads that are related to a payload of the first synchronization block;
a combiner configured to combine the payload of the first synchronization block with the payloads of the one or more additional synchronization blocks to obtain a combined payload; and
a decoder configured to decode the combined payload to obtain payload data.

2. The wireless communication device of claim 1, further comprising one or more antennas; and
a radio transceiver, wherein the one or more antennas and the radio transceiver are configured to receive and process radio signals to obtain the received signal.

3. The wireless communication device of claim 1, wherein the pattern of synchronization blocks has a predefined duration and a predefined set of position indices for synchronization blocks in the pattern.

4. The wireless communication device of claim 1, wherein the controller is configured to identify the one or more additional synchronization blocks by identifying, based on the position, one or more synchronization blocks that are also within the pattern of synchronization blocks as the one or more additional synchronization blocks.

5. The wireless communication device of claim 1, wherein the combiner is configured to combine the payload of the first synchronization block with the payloads of the one or more additional synchronization blocks using soft-combining.

6. The wireless communication device of claim 1, wherein the payload of the first synchronization block and the payloads of the one or more additional synchronization blocks comprise a system frame number field that is the same value.

7. A wireless communication device comprising:
a reference signal detector configured to detect, in a received signal, a first synchronization block and a second synchronization block;
a combiner configured to combine a payload of the first synchronization block with payloads of one or more additional first synchronization blocks to obtain a first combined payload, to combine a payload of the second synchronization block with payloads of one or more additional second synchronization blocks to obtain a second combined payload, wherein the combiner is further configured to process and combine the first and second combined payloads based on a difference in system frame number to obtain a combined compensated payload; and
a decoder configured to decode the combined compensated payload to obtain payload data.

8. The wireless communication device of claim 7, wherein the combiner is configured to combine the first synchronization block with the one or more additional first synchronization blocks using soft-combining.

9. The wireless communication device of claim 7, wherein the payload of the first synchronization block and the payloads of the one or more additional first synchronization blocks comprise a system frame number field that is the same value.

10. The wireless communication device of claim 9, wherein the system frame number field of the payload of the first synchronization block and the payloads of the one or more additional first synchronization blocks is different from a system frame number field of the payload of the second synchronization block and the payloads of the one or more additional second synchronization blocks.

11. The wireless communication device of claim 7, wherein the first synchronization block is a Synchronization Signal and Physical Broadcast Channel (SS/PBCH) block, and the payload data is PBCH data.

12. The wireless communication device of claim 7, wherein the combiner is configured to process and combine the first and second combined payloads by:
placing the first combined payload in a buffer at a first buffer position having a first hypothesis system frame number;
placing the second combined payload in the buffer at a second buffer position having a second hypothesis system frame number;
compensating the first and second combined payloads based on the first and second hypothesis system frame numbers to obtain a first compensated payload and a second compensated payload; and
combining the first and second compensated payloads to obtain the combined compensated payload.

13. A method of performing wireless communications at a wireless device, the method comprising:
- detecting a first synchronization block and a reference signal in a received signal;
- determining a position of the first synchronization block within a pattern of synchronization blocks, wherein determining the position of the first synchronization block comprises matching the reference signal with a predefined reference signal that is paired with the position;
- identifying, based on the position, one or more additional synchronization blocks comprising payloads that are related to a payload of the first synchronization block;
- combining the payload of the first synchronization block with the payloads of the one or more additional synchronization blocks to obtain a combined payload; and
- decoding the combined payload to obtain payload data.

14. The method of claim 13, wherein said identifying the one or more additional synchronization blocks comprises identifying, based on the position, one or more synchronization blocks that are also within the pattern of synchronization blocks as the one or more additional synchronization blocks.

15. The method of claim 14, wherein the payload of the first synchronization block and the payloads of the one or more additional synchronization blocks comprise a system frame number field that is the same value.

16. The method of claim 14, further comprising:
- combining a payload of a second synchronization block with payloads of one or more second additional synchronization blocks to obtain a second combined payload; and
- processing and combining the combined payload and the second combined payload based on a difference in system frame numbers to obtain a combined compensated payload,
- wherein said decoding the combined payload comprises decoding the combined compensated payload.

17. The method of claim 16, wherein the second synchronization block and the one or more second additional synchronization blocks are from a different pattern of synchronization blocks than the first synchronization block and the one or more additional synchronization blocks.

18. A wireless communication device comprising:
- a reference signal detector configured to detect a first synchronization block in a received signal and to determine a position of the first synchronization block within a pattern of synchronization blocks;
- a controller configured to identify, based on the position, one or more additional synchronization blocks comprising payloads that are related to a payload of the first synchronization block;
- a combiner configured to combine the payload of the first synchronization block with the payloads of the one or more additional synchronization blocks to obtain a combined payload; and
- a decoder configured to decode the combined payload to obtain payload data; and
- a protocol controller configured to control communication with a cell that transmitted the first synchronization block based on the payload data.

* * * * *